United States Patent
Ueda

(10) Patent No.: US 9,891,358 B2
(45) Date of Patent: Feb. 13, 2018

(54) OPTICAL FILTER AND OPTICAL APPARATUS

(71) Applicant: CANON KABUSHIKI KAISHA, Tokyo (JP)

(72) Inventor: Kei Ueda, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 34 days.

(21) Appl. No.: 15/071,334

(22) Filed: Mar. 16, 2016

(65) Prior Publication Data
US 2016/0274283 A1    Sep. 22, 2016

(30) Foreign Application Priority Data
Mar. 19, 2015    (JP) ................. 2015-056418

(51) Int. Cl.
*G02B 5/18*    (2006.01)
*G02B 5/28*    (2006.01)

(52) U.S. Cl.
CPC .......... *G02B 5/285* (2013.01); *G02B 5/1861* (2013.01); *G02B 5/1885* (2013.01)

(58) Field of Classification Search
CPC ............................ G02B 5/1838; G02B 5/1861
USPC ........................................ 359/350, 576, 572
See application file for complete search history.

(56) References Cited

U.S. PATENT DOCUMENTS

| 4,915,463 A * | 4/1990 | Barbee, Jr. ........... | G02B 5/1838 |
| | | | 359/350 |
| 8,116,002 B2 * | 2/2012 | Hoose ................. | G02B 5/1861 |
| | | | 359/350 |
| 9,239,515 B2 * | 1/2016 | Hayashi .................... | G03F 1/24 |
| 2011/0156987 A1 * | 6/2011 | Magnusson .......... | G02B 5/0833 |
| | | | 343/912 |

FOREIGN PATENT DOCUMENTS

| JP | 2007334318 A | 12/2007 |
| JP | 2008058561 A | 3/2008 |

* cited by examiner

*Primary Examiner* — Audrey Y Chang
(74) *Attorney, Agent, or Firm* — Rossi, Kimms & McDowell LLP

(57) ABSTRACT

An optical filter includes a first multilayer film structure including first and second optical layers which are constituted by materials different from each other, and a second multilayer film structure including third and fourth optical layers which are constituted by materials different from each other, the first multilayer film structure includes a first unit multilayer film with a width W1 including the first optical layer and the second optical layer, and a second unit multilayer film with a width W2 including the first optical layer and the second optical layer laminated alternately, the first and second unit multilayer films are shifted from each other in a lamination direction of the first and second optical layers, and constitute a unit structure in which the first and second unit multilayer films are arranged adjacent to each other in an arrangement direction orthogonal to the lamination direction.

15 Claims, 15 Drawing Sheets

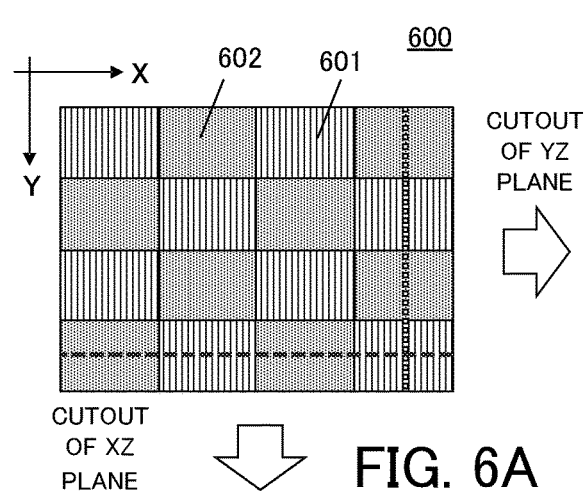
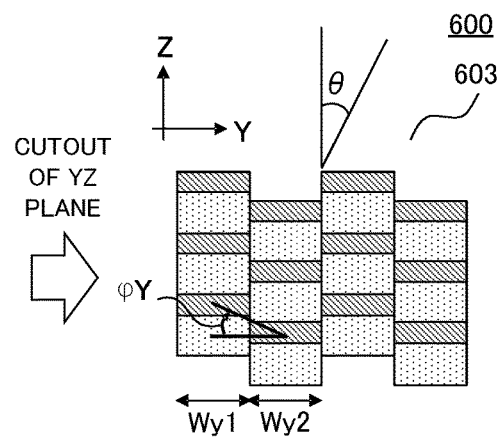
FIG. 6A
FIG. 6B
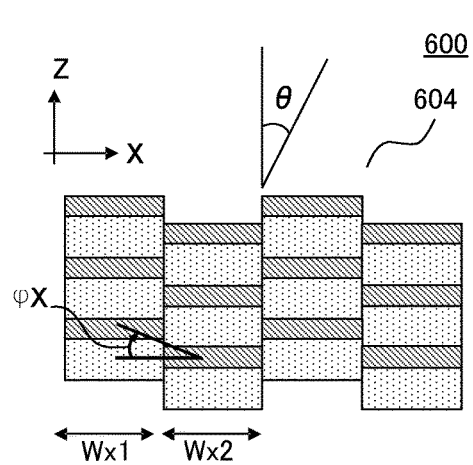
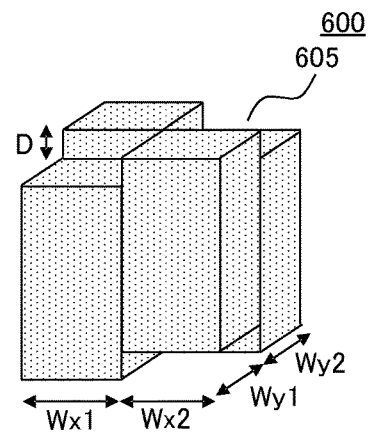
FIG. 6C
FIG. 6D

US 9,891,358 B2

OPTICAL FILTER AND OPTICAL APPARATUS

BACKGROUND OF THE INVENTION

Field of the Invention

The present invention relates to an optical filter, and more particularly to an optical filter having a color selectivity.

Description of the Related Art

Previously, a color selective filter is used to select light in a desired wavelength band from an incident light beam. As the color selective filter, typically, a spectral filter (multilayer film interference filter) using multilayer film interference is known. The multilayer film interference filter is obtained by laminating periodic structures where a refractive index or a layer thickness has been adjusted in accordance with the desired wavelength band. Compared with an absorption spectral filter, spectral characteristics of the multilayer film interference filter does not contain absorption, and accordingly there is an advantage that a loss of light intensity or a heat generation does not occur.

On the other hand, in the multilayer film interference filter, an effective layer thickness changes depending on a ray advancing angle in a medium, and accordingly a reflection wavelength varies depending on an incident angle. Therefore, a harmful effect occurs due to a wavelength shift when a light beam incident with an opening angle with respect to the multilayer film interference filter is dispersed.

In order to reduce an incident angle dependency in a dichroic filter or a dichroic prism, Japanese Patent Laid-open No. 2008-58561 and Japanese Patent Laid-open No. 2007-334318 disclose a method of introducing an M-layer with a middle refractive index instead of a L-layer with a low refractive index and a method of introducing an absorption layer to compensate spectral characteristics at the time of an oblique incidence.

However, in the method disclosed in Japanese Patent Laid-open No. 2008-58561, the change of an optical path due to the oblique incidence cannot be effectively reduced. In the method disclosed in Japanese Patent Laid-open No. 2007-334318, a problem such as reduction of a band width due to the oblique incidence occurs. While the incidence angle dependency can be reduced by using a multilayer film in an alternate structure having an in-plane fine structure, it is difficult to sufficiently reduce a reflection wavelength shift at the time of the low-angle incidence.

SUMMARY OF THE INVENTION

The present invention provides an optical filter and an optical apparatus which are capable of reducing a change of a reflection wavelength in a desired incident angle range.

An optical filter as one aspect of the present invention includes a first multilayer film structure including a first optical layer and a second optical layer which are constituted by materials different from each other and a second multilayer film structure including a third optical layer and a fourth optical layer which are constituted by materials different from each other, the first multilayer film structure includes a first unit multilayer film with a width W1 including the first optical layer and the second optical layer, the second optical layer having a refractive index lower than a refractive index of the first optical layer, the first optical layer and the second optical layer being laminated alternately and a second unit multilayer film with a width W2 including the first optical layer and the second optical layer laminated alternately, the first and second unit multilayer films are shifted from each other by a displacement D in a lamination direction of the first and second optical layers, and constitute a unit structure in which the first and second unit multilayer films are arranged adjacent to each other in an arrangement direction orthogonal to the lamination direction, the second multilayer film structure includes a multilayer film including the third optical layer and the fourth optical layer, the fourth optical layer having a refractive index lower than a refractive index of the third optical layer, the third optical layer and the fourth optical layer being laminated alternately, and predetermined expressions are satisfied.

An optical apparatus as another aspect of the present invention includes an image display element and the optical filter.

An optical apparatus as another aspect of the present invention includes an image pickup element and the optical filter.

Further features and aspects of the present invention will become apparent from the following description of exemplary embodiments with reference to the attached drawings.

BRIEF DESCRIPTION OF THE DRAWINGS

FIGS. 6A to 6D are configuration diagrams of an optical filter including a first multilayer film structure with a two-dimensional period in this embodiment.

DESCRIPTION OF THE EMBODIMENTS

Exemplary embodiments of the present invention will be described below with reference to the accompanied drawings.

Figure 1A:
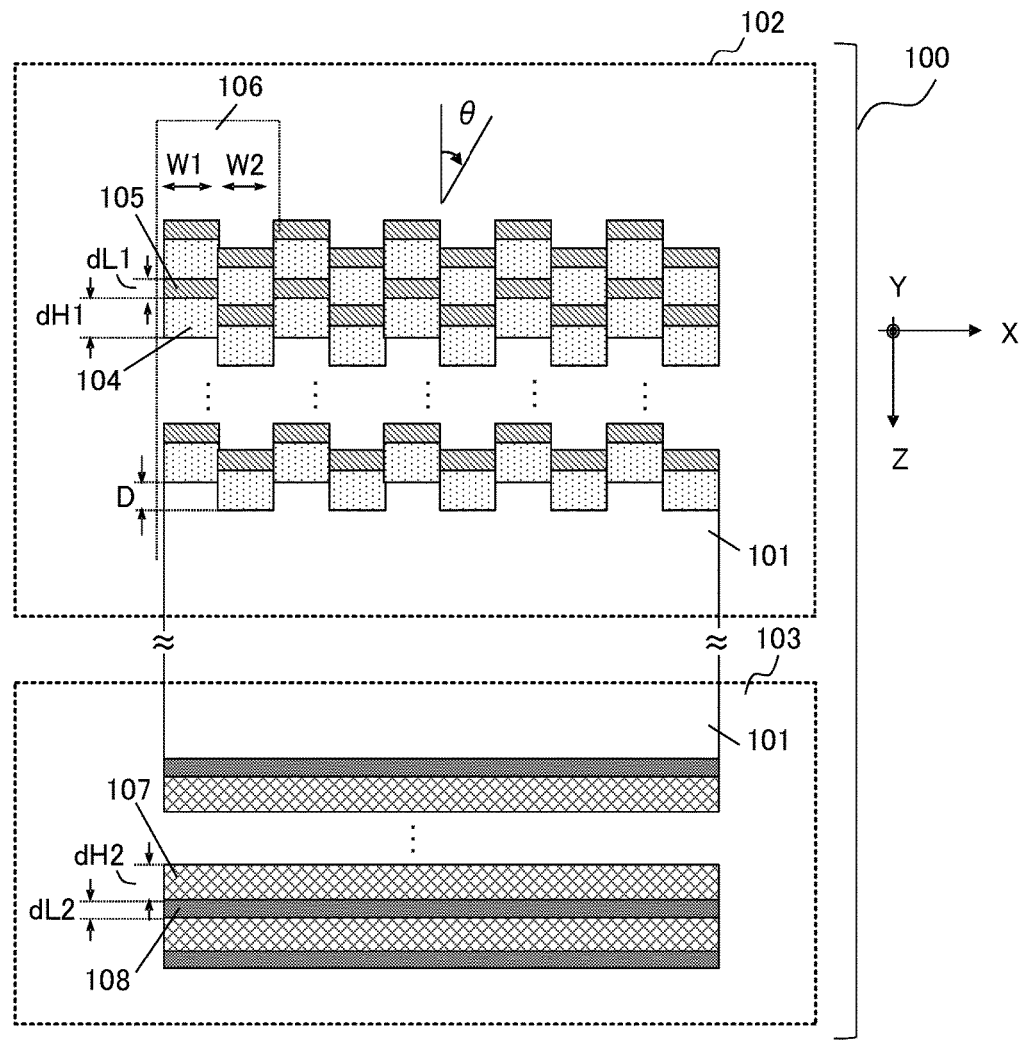
FIGS. 1A and 1B are a configuration diagram of an optical filter and a diagram of a relation between a tilt angle $\varphi$ and an incident angle $\theta$ in this embodiment (Embodiment 1), respectively.

First, referring to FIG. 1A, a configuration of an optical filter (optical element) in this embodiment will be described. FIG. 1A is a configuration diagram of an optical filter 100. The optical filter 100 includes two multilayer film structures (a first multilayer film structure 102 and a second multilayer film structure 103) having different structures from each other which are laminated on a substrate 101 having a refractive index ns and a visible transmissivity. In other words, the first multilayer film structure 102 is formed on a first main surface of the substrate 101 (i.e., formed on an upper surface of the substrate 101 in FIG. 1A), and the second multilayer film structure 103 is formed on a second main surface opposite to the first main surface of the substrate 101 (i.e., formed on a lower surface of the substrate 101 in FIG. 1A).

The first multilayer film structure 102 is a multilayer film structure which has an in-plane fine shape and an alternate structure. The second multilayer film structure 103 is a typical multilayer film structure. Each of the first multilayer film structure 102 and the second multilayer film structure 103 includes a repetitive structure by a plurality of optical layers, and it reflects light in a predetermined band. In this embodiment, X and Y directions are defined as in-plane directions of lamination orthogonal to each other, and a Z direction is defined as a depth direction (direction orthogonal to a lamination plane). A sign of the Z direction is positive in a direction from a surface layer toward the substrate 101 (i.e., downward direction in FIG. 1A). The in-plane fine shape means a shape in which a first unit structure film (lamination structure with a width W1) and a second unit structure film (lamination structure with a width W2) are arranged alternately in a predetermined arrangement direction (for example, the X direction) or in two dimensions (for example, the X and Y directions) in the XY plane illustrated in FIG. 1A. The alternate structure means a structure in which a lamination structure constituted by optical layers 104 and 105 included in the first unit structure film and a lamination structure constituted by optical layers 104 and 105 included in the second unit structure film are shifted (i.e., displaced) from each other by a predetermined shift amount (displacement D) in the Z direction (lamination direction).

In this embodiment, the first multilayer film structure 102 is configured by laminating optical layers having at least two types of materials (a first optical layer and a second optical layer having materials different from each other) m times repeatedly. For the purpose of suppressing ripple or the like, the first multilayer film structure 102 may include three or more types of optical layers. The second multilayer film structure 103 is configured by laminating optical layers having at least two types of materials (a third optical layer and a fourth optical layer having materials different from each other) k times repeatedly. For the purpose of suppressing the ripple or the like, the second multilayer film structure 103 may include three or more types of optical layers.

In this embodiment, the optical filter 100 (first multiyear film structure 102) includes an optical layer 104 (first optical layer) having a refractive index nH1 and an average layer thickness dH1 (physical layer thickness) in the Z direction (lamination direction) in a repetitive structure (in a plurality of optical layers). The optical filter 100 includes an optical layer 105 (second optical layer) having a refractive index nL1 lower than the refractive index nH1 and having an average layer thickness dL1 (physical layer thickness) in the Z direction. The optical filter 100 is configured by arranging a plurality of unit structures 106. Each of the unit structures 106 includes a first unit multilayer film with the width W1 configured by laminating the optical layers 104 and 105 alternately m times repeatedly, and a second unit multilayer film with the width W2 configured by laminating the optical layers 104 and 105 alternately. The two unit multilayer films having the widths W1 and W2 (first and second unit multilayer films) have an alternate structure in which the unit multilayer films are arranged to be displaced (i.e., shifted) from each other by the displacement D (shift width) in the Z direction (lamination direction). The unit structure 106 is, for example as illustrated in FIG. 1A, configured by laminating the optical layers 104 and 105 alternately on the substrate 101 where groove (concavo-convex) patterning is applied. However, this embodiment is not limited to the manufacturing method using the groove patterning on the substrate 101.

In this embodiment, the optical filter 100 (second multiyear film structure 103) includes an optical layer 107 (third optical layer) having a refractive index nH2 and an average layer thickness dH2 (physical layer thickness) in the Z direction (lamination direction) in a repetitive structure (in a plurality of optical layers). The optical filter 100 includes an optical layer 108 (fourth optical layer) having a refractive index nL2 lower than the refractive index nH2 and having an average layer thickness dL2 (physical layer thickness) in the Z direction.

In FIG. 1A, the second multilayer film structure 103 is formed on the back of a surface on which the first multilayer film structure 102 is formed, but this embodiment is not limited to this configuration and the optical filter 100 only needs to include two multilayer film structures. For example, the second multilayer film structure 103 may be formed under the first multilayer film structure 102, or alternatively the second multilayer film structure 103 may be formed on a substrate different (separated) from the substrate 101 on which the first multilayer film structure 102 is formed.

The optical filter 100 includes the first multilayer film structure 102 and the second multilayer film structure 103, and the first multilayer film structure 102 is formed by arranging the plurality of unit structures 106 in plane (in an XY plane). In this embodiment, the unit structure 106 satisfies conditional expressions (1) and (2) below. Accordingly, an optical filter which is capable of reducing an incident angle dependency of a reflection wavelength or a transmission wavelength can be achieved.

$$15 \text{ deg.} < \varphi < 55 \text{ deg.} \tag{1}$$

$$1.5 < nH1 \cdot dH1/nL1 \cdot dL1 < 5.0 \tag{2}$$

In conditional expression (1), symbol φ is a tilt angle of a structure (multilayer film structure) defined in the unit structure 106 illustrated in FIG. 1A. The tilt angle φ is defined by expression (3a) or (3b) below.

$$\varphi=\tan^{-1}(|D|/0.5(W1+W2))(|D|\leq 0.5(dL1+dH1)) \quad (3a)$$

$$\varphi=\tan^{-1}(((dL1+dH1)-|D|)/0.5(W1+W2))(|D|>0.5(dL1+dH1)) \quad (3b)$$

A period of the multilayer film in the depth direction (Z direction) is (dL1+dH1), and accordingly the magnitude relationship of the tilt angles φ in expressions (3a) and (3b) are reversed at the boundary of D=0.5(dL1+dH1). Therefore, a conditional branch is performed in accordance with the displacement D, and a value indicating a smaller absolute value of values given by expressions (3a) and (3b) is defined as the tilt angle cp. Hereinafter, expressions (3a) and (3b) are collectively referred to as expression (3).

Figure 1B:
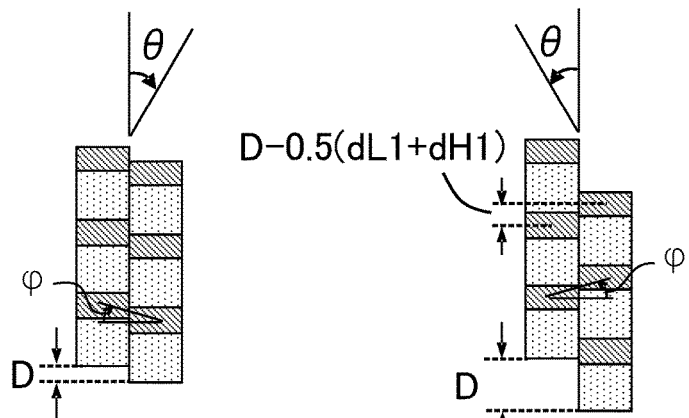

FIG. 1B is a diagram of defining a relationship between the defined tilt angle φ and the sign (positive or negative) of a rotation direction of the incident angle θ. Symbols [a] and [b] in FIG. 1B indicate the tilt angles φ defined by expressions (3a) and (3b), respectively. A rotation direction to widen (increase) the tilt angle φ in FIG. 1B from the XY plane direction (horizontal direction) is defined as a positive rotation direction of the incident angle θ. As indicated by [a] in FIG. 1B, when |D|≤0.5(dL1+dH1) is satisfied, a clockwise direction is defined as the positive rotation direction of the incident angle θ. On the other hand, as indicated by [b] in FIG. 1B, when |D|>0.5(dL1+dH1) is satisfied, a counterclockwise direction is defined as the positive rotation direction of the incident angle θ. Hereinafter, various conditions of the optical filter to be needed for further reducing the incident angle dependency will be described.

First, before describing the various conditions, the incident angle dependency of a center reflection wavelength is described by comparing a simple multilayer film structure corresponding to the second multilayer film structure 103 with an alternate multilayer film structure corresponding to the first multilayer film structure 102. In the comparative description, the incident angle dependencies of reflection spectra of the simple multilayer film that does not have an in-plane fine shape and the alternate multilayer film each has structural parameters illustrated in Table 1 are obtained by calculation. It is assumed that the alternate multilayer film structure is uniform in the Y direction and is formed such that a unit structure constitutes a one-dimensional grating in the X direction. All the calculations of the spectra are performed by the Finite Difference Time Domain (FDTD) method or the Rigorous Coupled Wave Analysis (RCWA) method. The FDTD method is a method of calculating time evolution of an electric field and a magnetic field by dividing an input permittivity distribution structure into minute mesh spaces and by solving the Maxwell equation for mesh spaces adjacent to each other. The RCWA method is a calculation method of obtaining a reflection/transmission diffraction efficiency for an entire structure by performing the Fourier series expansion of a permittivity distribution of each layer of an input step grating, by obtaining a reflection/transmission diffraction component obtained by a boundary condition of each layer given by the Maxwell equation, and by performing sequential calculation.

Figure 2A:
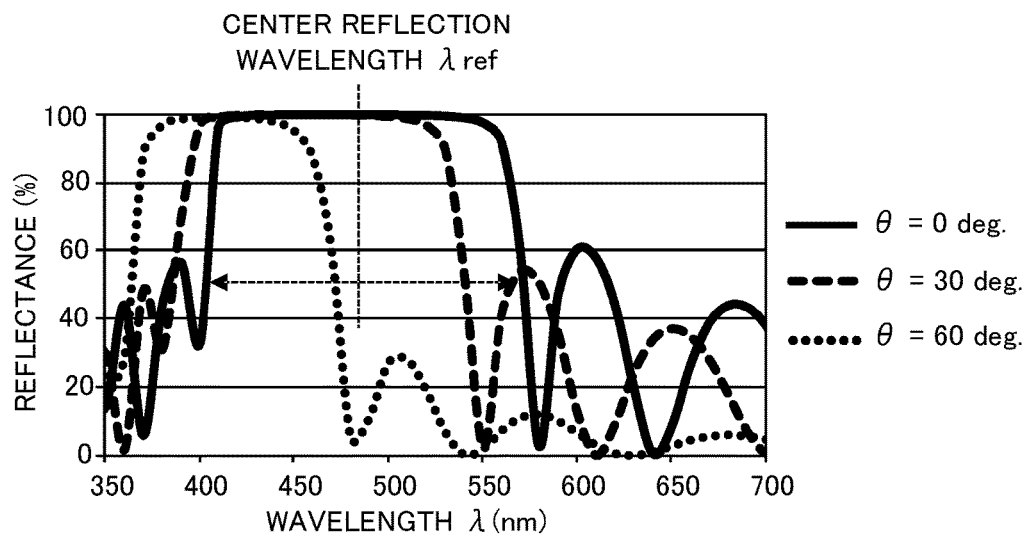
FIGS. 2A and 2B are diagrams of illustrating an incident angle dependencies of spectrum reflectances of optical filters constituted by a simple multilayer film and an alternate multilayer film, respectively.

FIG. 2A is the incident angle dependency of the spectrum reflectance in the simple multilayer film for which the structural parameters as a comparative example are indicated in Table 1. Hereinafter, a refractive index and a layer thickness of an optical layer with a high refractive index in the simple multilayer film are denoted by nH2 and dH2, respectively, and a refractive index and a layer thickness of an optical layer with a low refractive index in the simple multilayer film are denoted by nL2 and dL2, respectively. In FIG. 2A, a horizontal axis indicates a wavelength λ (nm), and a vertical axis indicates a reflectance (%). For the purpose of arguments of the incident angle dependency of the wavelength shift amount of the spectrum reflection, as illustrated in FIG. 2A, a center reflection wavelength λref is defined as a wavelength at the midpoint (center) between wavelengths at the foot on the short wavelength side and the long wavelength side where the reflectance is 50%. FIG. 2A illustrates a result of each of the incident angles θ=0, 30, and 60 deg. The incident light is polarized light (P-polarized light). In the simple multilayer film, a behavior of a monotonic wavelength shift with increasing the incident angle θ is obtained.

Figure 2B:
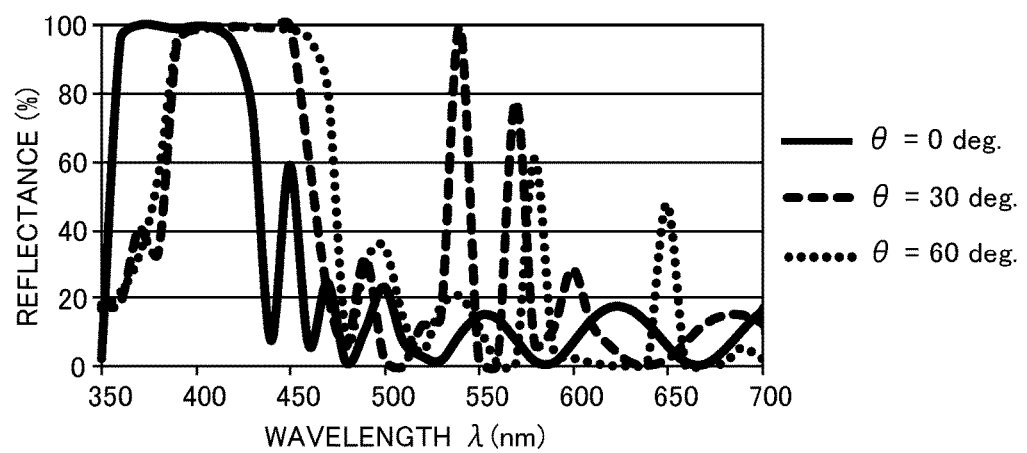

Subsequently, the incident angle dependency in the alternate multilayer film structure corresponding to the first multilayer film structure 102 will be described. Hereinafter, a refractive index and a layer thickness of an optical layer with a high refractive index in the alternate multilayer film are denoted by nH1 and dH1, respectively, and a refractive index and a layer thickness of an optical layer with a low refractive index in the alternate multilayer film are denoted by nL1 and dL1, respectively. FIG. 2B is the incident angle dependency of the spectrum reflectance in the alternate multilayer film for which the structural parameters in this embodiment are indicated in Table 1. FIG. 2B illustrates a result of each of the incident angles θ=0, 30, and 60 deg. The incident plane is an XZ plane perpendicular to the grating, and the incident light is P-polarized light (TM polarization). In FIG. 2B, the center reflection wavelength λref in the alternate multilayer film structure monotonically increases with increasing the incident angle. The incident angle dependencies in the simple multilayer film and the alternate multilayer film illustrated in FIGS. 2A and 2B, respectively, indicate wavelength shifts in directions opposite to each other.

Figure 3A:
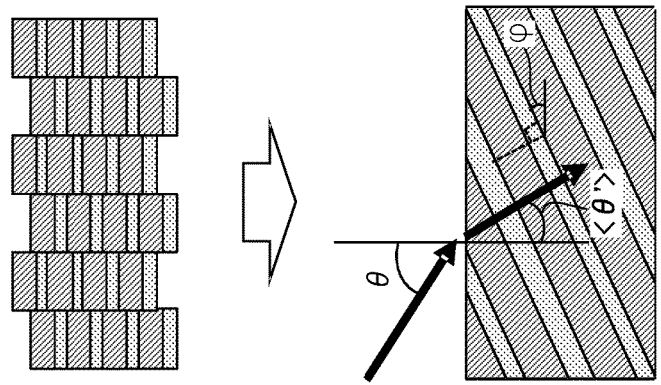
FIGS. 3A to 3C are diagrams of illustrating the incident angle dependencies of center reflection wavelengths of the optical filters constituted by the simple multilayer film and the alternate multilayer film.
Figure 3B:
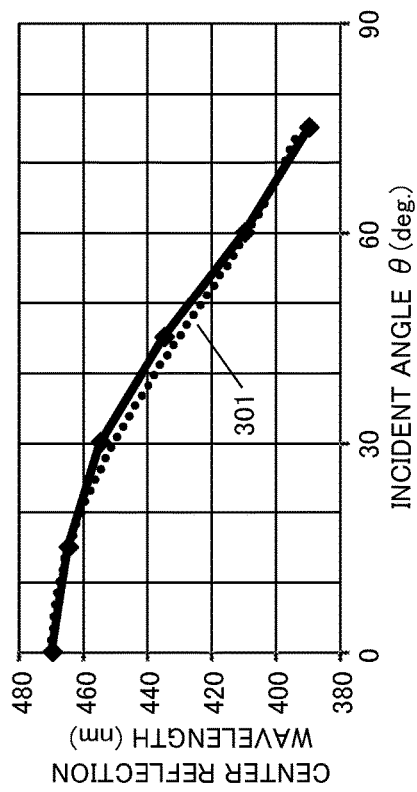

FIG. 3A is the incident angle dependency of the center reflection wavelength λref in the simple multilayer film for which the structural parameters as a comparative example are indicated in Table 1. FIG. 3B is the incident angle dependency of the center reflection wavelength λref in the alternate multilayer film for which the structural parameters in this embodiment are indicated in Table 1. In FIGS. 3A and 3B, a horizontal axis indicates an incident angle θ, and a vertical axis indicates a center reflection wavelength λref. In FIGS. 3A and 3B, solid lines indicate the incident angle dependencies for the multilayer film structure having the structural parameters in Table 1. A dotted line 301 in FIG. 3A is a calculation model result by the Snell's law.

As illustrated in FIG. 3A, the incident angle dependency of the center reflection wavelength λref in the simple multilayer film as a comparative example is similar to the calculation model result indicated by the dotted line 301. On the other hand, the incident angle dependency of the center reflection wavelength λref in the alternate multilayer film in this embodiment cannot be explained by using the calculation model by the Snell's law applied similarly to the simple multilayer film since the center reflection wavelength λref is shifted to be a long wavelength with increasing the incident angle θ. This is because the structure of this embodiment is an anisotropic structure in which the period in the in-plane X direction is approximately the same as the wavelength and it is sufficiently long compared with the period in the depth Z direction.

Figure 3C:
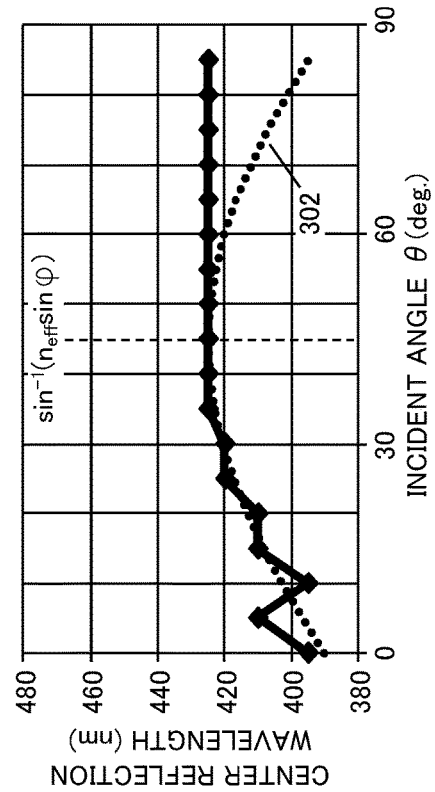

Accordingly, the multilayer film of this embodiment is assumed to be a tilt multilayer film as illustrated in FIG. 3C to perform approximation calculation of the center reflection wavelength λref. For simplicity, the approximation calculation is performed by using an average advancing angle <θ'> in the medium. The average advancing angle <θ'> is obtained as <θ'>=sin$^{-1}$(sin θ/n$_{eff}$) based on the Snell's law by using an effective refractive index n$_{eff}$={2/(1/nH1$^2$+1/nL1$^2$)}$^{1/2}$ when polarized light (TM polarization) that is parallel to the arrangement direction of the grating is perpendicularly incident. In the calculation of the effective refractive index n$_{eff}$, a one-dimensional grating structure where a medium with a refractive index nH1 and a medium with a refractive index nL1 are filled at a rate of 1:1 is assumed. When the average advancing angle <θ'> is used, the incident angle dependency (dependency of the incident angle θ) of the center reflection wavelength λref in the tilt multilayer film follows λref(θ)=λref' cos(<θ'>−φ). Symbol λref' is a reflection wavelength that is specified by an optical length nd of a configuration film determined by λref'=2 (nHdH+nLdL)cos φ. Symbol cos φ in the expression representing λref' is a term caused by a substantial decrease of an optical layer due to the assumption of the tilt multilayer film.

A dotted line 302 in FIG. 3B indicates a calculation model result of the incident angle dependency of the center reflection wavelength λref when the multilayer film is approximated as the tilt multilayer film. The dotted line 302 of the calculation model result appropriately reproduces the result of this embodiment within an incident angle range from 0 deg. to sin$^{-1}$ (n$_{eff}$ sin φ). The angle sin$^{-1}$ (n$_{eff}$ sin φ) is a value at which the average advancing angle <θ'> in the medium is φ, and the angle corresponds to the incident angle in air. According to the relational expression of λref(θ), a change of an effective layer thickness increases as a shift between the average advancing angle <θ'> in the medium and the tilt angle φ is enlarged, and thus the wavelength shift amount increases with respect to the change of the angle. As described above, the behavior of the monotonic long wavelength shift with respect to the increase of the incident angle in the alternate multilayer film structure is not explained by the incident angle dependency using the Snell's law in the simple multilayer film, instead, it is explained by treating the multilayer film as the tilt multilayer film.

According to the comparison of FIGS. 3A and 3B, the wavelength shift amount in the alternate multilayer film structure is greatly reduced within the angle range centered around sin$^{-1}$ (n$_{eff}$ sin φ) compared with the simple multilayer film. In other words, within the angle range centered around sin$^{-1}$ (n$_{eff}$ sin φ), the alternate multilayer film structure functions as a filter which reduces the wavelength shift amount. When the incident angle range which is required during the use of the filter is sufficiently wide, the average advancing angle <θ'> and the tilt angle φ can coincide with each other. In this case, it is possible to reduce the wavelength shift amount greatly within the required incident angle range. If the range of the tilt angle φ in conditional expression (1) is satisfied, the incident angle dependency of the reflection wavelength can be reduced within the sufficiently-wide incident angle range centered around sin$^{-1}$ (n$_{eff}$ sin φ).

Figure 4A:
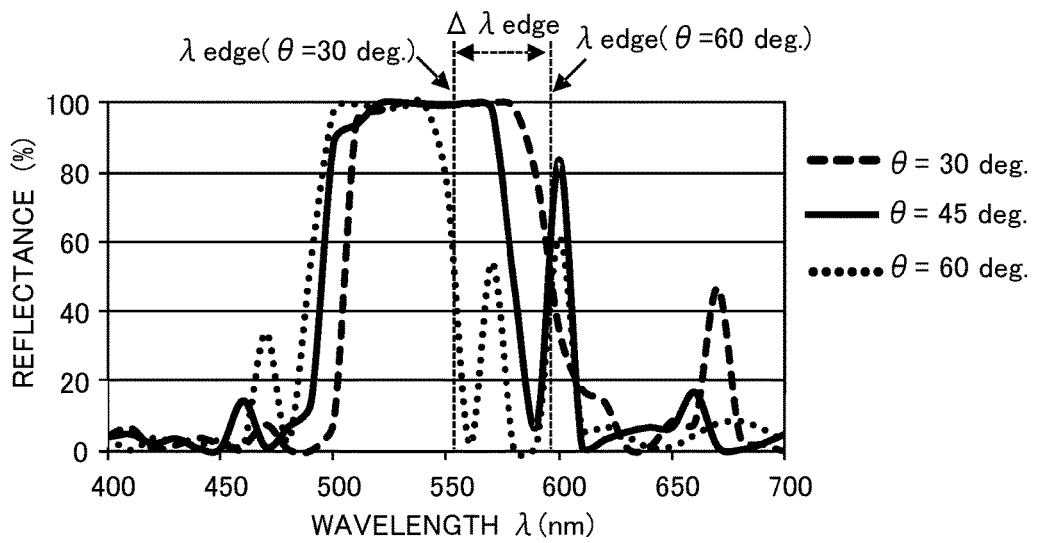
FIGS. 4A and 4B are diagrams of illustrating the incident angle dependency of the spectrum reflectance of the alternate multilayer film and a dependency of $nH1 \cdot dH1/nL1 \cdot dL1$ of a wavelength shift amount $\Delta\lambda$edge, respectively.

Next, the necessity of satisfying conditional expression (2) will be described since it is preferred that the incident angle dependency is further reduced by the first multilayer film structure 102 solely. FIG. 4A is a diagram of illustrating the incident angle dependency of the spectrum reflectance of the first multilayer film structure 102 as an alternate multilayer film. In FIG. 4A, definitions of λedge and Δλedge are illustrated on condition that |θ|min=30 deg. and |θ|max=60 deg. are satisfied. Symbols |θ|max and, |θ| min are a maximum value (maximum incident angle) and a minimum value (minimum incident angle) of an absolute value of the incident angle (ray incident angle range), respectively. Symbol λedge is defined as a wavelength at which a shift amount of a specific incident angle range is greater of wavelengths at a short wavelength side and a long wavelength having a reflectance of 50% in the reflectance band within a visible range from 400 nm to 700 nm. Symbol Δλedge is defined as a shift amount of the wavelength λedge within the specific incident angle range. In the comparison of each embodiment, the shift amount Δλedge is adopted as an evaluation value of the incident angle dependency of the wavelength shift amount.

In FIG. 4A, the refractive index nH1 of the optical layer 104 is 2.36, and the average layer thickness dH1 of the optical layer 104 is 70 nm. The refractive index nL1 of the optical layer 105 is 1.47, and the average layer thickness dL1 of the optical layer 105 is 115 nm. The first multilayer film structure 102 includes the substrate 101 having the refractive index ns=1.47, the width W1=W2=135 nm, and D=92.5 nm, and it is arranged such that alternate unit structures with the number of repetitions of eight form a one-dimensional grating in the X direction. The incident plane is the XZ plane, the polarized light is P-polarized light (TM polarization), and the incident angle range (range of the incident angle θ) is from θ=30 deg. to θ=60 deg. In this configuration, nH1·dH1/nL1·dL1 is equal to 1.0, and a result of Δλedge=40 nm is obtained.

Figure 4B:
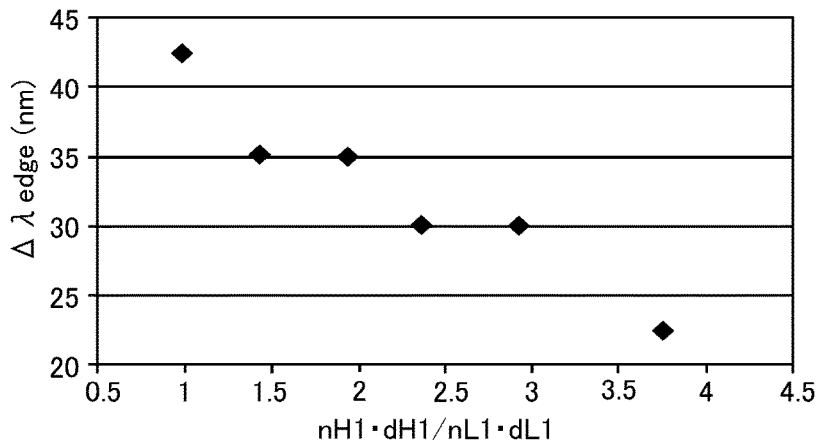

Subsequently, the dependency of nH1·dH1/nL1·dL1 with respect to Δλedge is considered when a ratio of dH and dL is changed such that the center reflection wavelength λref at θ=45 deg. is constant within a range from AO to 540 nm. FIG. 4B is a diagram of illustrating the dependency of nH1·dH1/nL1·dL1 with respect to Δλedge. Symbol λedge is defined as a wavelength of the foot at a long wavelength side where the reflectance is 50%. In FIG. 4B, dH1 and dL1 obtained when the horizontal axis indicates the minimum value of nH1·dH1/nL1·dL1=1.0 are 70 nm and 115 nm, respectively, and dH1 and dL1 obtained when the horizontal axis indicates the maximum value of nH1·dH1/nL1·dL1=3.8 are 105 nm and 45 nm, respectively. As illustrated in FIG. 4B, Δλedge decreases with increasing the value of nH1·dH1/nL1·dL1. According to plots illustrated in FIG. 4B, the upper limit of the value of nH1·dH1/nL1·dL1 is 3.8. If the value of nH1·dH1/nL1·dL1 is further increased, the deterioration of the performance such as reduction of a band width and decrease of a reflectance is remarkable and therefore it is not preferable. Accordingly, in order to reduce the incident angle dependency effectively, it is necessary to set the value of nH1·dH1/nL1·dL1 to satisfy conditional expression (2).

In the descriptions above, it is shown that the alternate multilayer film has the performance to reduce the incident angle dependency compared with the simple multilayer film. However, as illustrated in FIG. 3B, there is a problem that the shift amount is large at the time of the incidence at a low angle. Accordingly, this embodiment combines the alternate multilayer film and the simple multilayer film to control each reflection wavelength, and thus the wavelength shift in the alternate multilayer film at the time of incidence at the low angle is reduced.

Figure 5A:
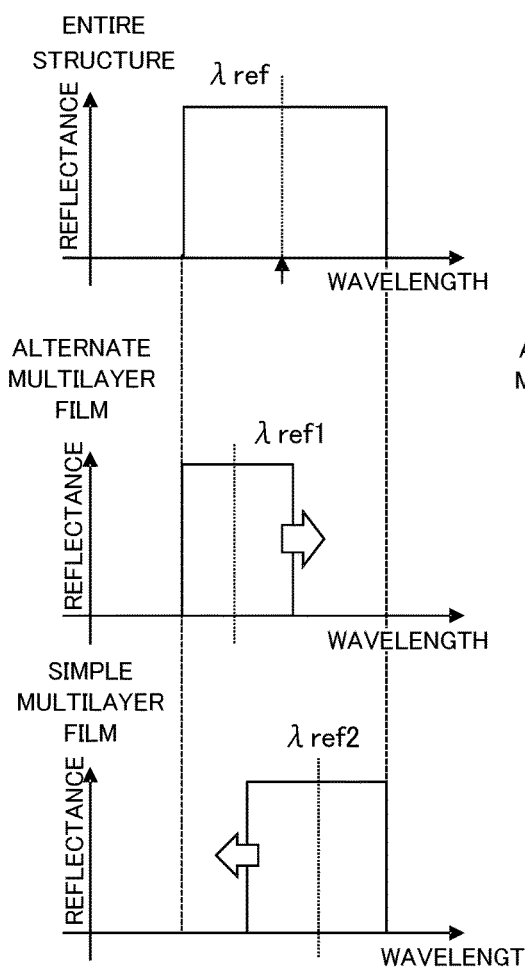
FIGS. 5A and 5B are explanatory diagrams of incident angle dependencies of spectrum reflectances of an optical filter formed by combining the simple multilayer film and the alternate multilayer film with respect to the incident angle.
Figure 5B:
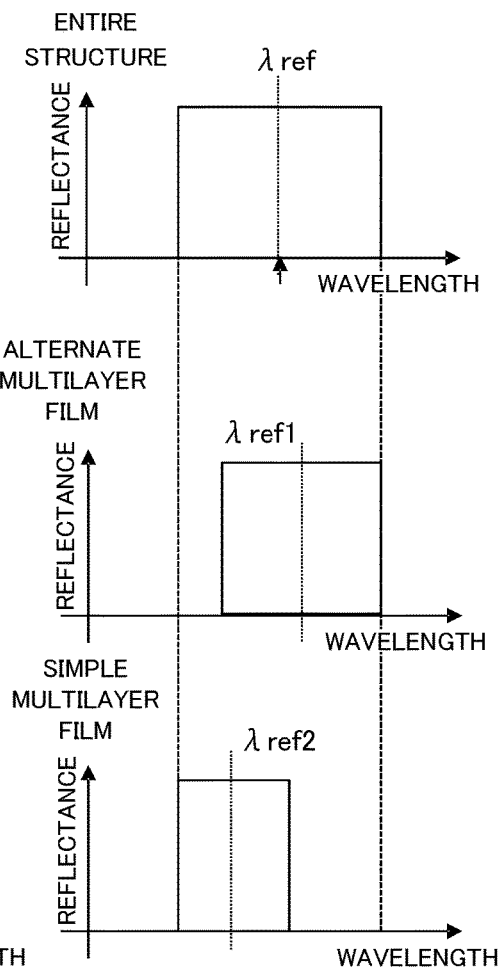

FIGS. 5A and 5B are conceptual diagrams of the incident angle dependencies in the reflection bands of the alternate multilayer film and the simple multilayer film where the reflection wavelength is controlled. FIG. 5A illustrates the reflection band in the alternate multilayer film, the simple multilayer film, and the combined structure (entire structure) when the incident angle is the minimum value |θ|min, and FIG. 5B illustrates the reflection band in the alternate multilayer film, the simple multilayer film, and the combined structure (entire structure) when the incident angle is the maximum value |θ|max. As described above, with respect to the alternate multilayer film and the simple multilayer film, shift directions of the reflection wavelengths with respect to the change of the incident angle θ are different from each other. By using this incident angle dependency, the reflection band of the simple multilayer film when the incident angle is the minimum value |θ|min is designed to overlap with the foot of the long wavelength side in the reflection band of the alternate multilayer film and also to form a continuous band. As a result, the center reflection wavelength λref does not depend on the incident angle θ, and an approximately-constant performance can be obtained. Accordingly, the structure obtained by combining the two multilayer films of the alternate multilayer film and the simple multilayer film has a performance which is capable of effectively reducing the incident angle dependency.

Next, in order that the optical filter 100 has a reflectance within a predetermined wavelength region, the relationship between the refractive index and the layer thickness in each of the first multilayer film structure 102 and the second multilayer film structure 103 to be satisfied will be described. A maximum value (maximum incident angle) and a minimum value (minimum incident angle) of the incident angle θ (ray incident angle range) when the optical filter 100 is used are defined as |θ|max and |θ|min, respectively. Center reflection wavelengths in the first multilayer film structure 102 and the second multilayer film structure 103 when a ray is incident at a center incident angle of θ0= (|θ|max+|θ|min)/2 are defined as λref1 and λref2, respectively. Incident polarized light is assumed to be parallel to the arrangement direction of the grating formed by the first multilayer film structure 102.

In order that the optical filter 100 has the reflectance within the predetermined wavelength band, it is necessary to control the center reflection wavelengths λref1 and λref2. Since the center reflection wavelengths λref1 and λref2 are determined depending on an optical length of each optical layer, it is preferred that the average layer thicknesses dH1 and dL1, the refractive indices nH1 and nL1, the average layer thicknesses dH2 and dL2, and the refractive indices nH2 and nL2 satisfy conditional expressions (4) and (5) below.

$$0.35 < ((nH1 \cdot dH1(\varphi,<\theta1>) + nL1 \cdot dL1(\varphi,<\theta1>))/\lambda ref1 < 0.65 \quad (4)$$

$$0.35 < ((nH2 \cdot dH2(\theta H2) + nL2 \cdot dL2(\theta L2))/\lambda ref2 < 0.65 \quad (5)$$

Conditional expressions (4) and (5) are described by using an effective layer thickness which is reduced due to the oblique incidence of each optical layer. Each of the center reflection wavelengths λref1 and λref2 is a wavelength defined by using a midpoint of wavelengths at a short side and a long side where the reflectance is 50% in the reflection band. An effective film thickness $dH1(\varphi,<\theta1>)$ by the oblique incidence of the average layer thickness dH1 in the first multilayer film structure 102 is given by $dH1(\varphi,<\theta1>) = dH1 \cdot \cos \varphi \cdot \cos(<\theta1> - \varphi)$. An effective film thickness $dL1(\varphi,<\theta1>)$ by the oblique incidence of the average layer thickness dL1 in the first multilayer film structure 102 is given by $dL1(\varphi,<\theta1>) = dL1 \cdot \cos \varphi \cdot \cos(<\theta1> - \varphi)$. An average advancing angle <θ1> and an average refractive index $n_{eff}$ are given by $<\theta1> = \sin^{-1}(n0 \cdot \sin \theta0/n_{eff})$ and $n_{eff} = \{2/(1/nH1^2 + 1/nL1^2)\}^{1/2}$, respectively. Symbol n0 is a refractive index of an incident medium onto the optical filter 100.

Effective film thicknesses dH2(θH2) and dL2 (θL2) by the oblique incidence in the second multilayer film structure 103 is given by $dH2(\theta H2) = dH2 \cdot \cos \theta H2$ and $dH2(\theta L2) = dL2 \cdot \cos \theta L2$, respectively. The advancing angles θH2 and θL2 are given by $\theta H2 = \sin^{-1}(n0 \cdot \sin \theta0/nH2)$ and $\theta L2 = \sin^{-1}(n0 \cdot \sin \theta0/nL2)$, respectively, according to the Snell's law. Thus, it is preferred that the average layer thicknesses dH1 and dL1, the refractive indices nH1 and nL1, the average layer thicknesses dH2 and dL2, the refractive indices nH2 and nL2, and the tilt angle φ satisfy conditional expressions (4) and (5).

Next, the relationship between the center reflection wavelength λref1 in the first multilayer film structure 102 and the center reflection wavelength λref2 in the second multilayer film structure 103 will be described. In order to suppress the wavelength shift, the relationship between the reflection wavelengths in the two structures needs to satisfy the relation described referring to FIGS. 5A and 5B. In other words, it is preferred that the center reflection wavelength λref1 in the first multilayer film structure 102 is shorter than the center reflection wavelength λref2 in the second multilayer film structure 103 when a ray is incident at the angle of |θ|max. On the other hand, it is preferred that the center reflection wavelength λref1 in the first multilayer film structure 102 is longer than the center reflection wavelength λref2 in the second multilayer film structure 103 when the ray is incident at the angle of |θ|min. If these relations are not satisfied, there is a possibility that the wavelength shift cannot be effective reduced within a predetermined incident angle range, which is not preferable.

The reflection wavelength bands which are formed by the first multilayer film structure 102 and the second multilayer film structure 103, respectively, needs to be continuous, and accordingly it is preferred that the center reflection wavelengths Δref1 and Δref2 at the center incident angle are approximately the same. When polarized light parallel to the arrangement direction of a grating formed by the first multilayer film structure 102 is incident at the center incident angle θ0, it is preferred that the center reflection wavelengths λref1 and λref2 satisfy conditional expression (6) below.

$$0.75 < (\lambda ref1/\lambda ref2) < 1.25 \quad (6)$$

If conditional expression (6) is not satisfied, a continuous reflection band may not be formed within a specific incident angle range, which is not preferable.

It is preferred that the incident angle dependency is reduced in the second multilayer film structure 103 solely and that it is included in the reflection band formed by the first multilayer film structure 102 when the ray is incident at a high angle. Accordingly, it is preferred that the refractive index nL2 satisfies conditional expression (7) below.

$$1.5 < nL2 < 2.0 \quad (7)$$

If conditional expression (7) is not satisfied, the incident angle dependency by the second multilayer film structure 103 solely cannot be effectively reduced. In addition, the band width is unnecessarily widened and an influence is given to the incident angle dependency of the optical filter 100, which is not preferable.

It is preferred that an absolute value |D| of the displacement (shift width) in the unit structure 106 has a value centered around a half period (dH1+dL1)/2 in the Z direction. Accordingly, it is preferred that conditional expression (8) below is satisfied.

$$0.25(dH1+dL1) \leq |D| \leq 0.75(dH1+dL1) \quad (8)$$

If conditional expression (8) is not satisfied, a reflection in a band centered around a wavelength λ0' estimated from an interference reflection condition of nH1dH1+nL1dL1=λ0'/2 in the simple multilayer film structure occurs greatly, which is not preferable.

The widths W1 and W2 do not necessarily have the same value as each other, and the widths W1 and W2 may satisfy conditional expressions (9) and (10) below.

$$W1 \geq W2 \quad (9)$$

$$W1/(W1+W2) \leq 0.8 \quad (10)$$

If a value exceeds the value at the right side of conditional expression (10), the reflection in the band centered around the wavelength λ0' estimated from the interference condition of nH1dH1+nL1dL1=λ0'/2 in the simple multilayer film structure, as well as the reflection resulting from the alternate multilayer film structure, occurs greatly, which is not preferable.

In order to reduce the incident angle dependency in this embodiment, it is preferred that a shift amount Δλedge caused by an incident angle change of a wavelength λedge (reflection edge wavelength) when a ray is incident within an angle range from |θ|min to |θ|max satisfies conditional expressions (11) and (12) below.

$$|\Delta\lambda\text{edge}|/n0 \leq 20 \text{ nm} \quad (11)$$

$$(\cos|\theta|\text{min} - \cos|\theta|\text{max})/n0 > 0.36 \quad (12)$$

In conditional expressions (11) and (12), symbol n0 is a refractive index of an incident medium onto the optical filter 100. Symbol λedge is a wavelength with a larger shift amount caused by the incident angle change in wavelengths at a short wavelength side and a long wavelength side at which a reflectance of 50% is obtained in a reflection band of the optical filter 100 within a visible range from 400 nm to 700 nm.

Next, suppression of a diffraction resulting from the first multilayer film structure 102 will be described. When the refractive index of the incident medium onto the first multilayer film structure 102 is n0, it is preferred that the width W=W1+W2 of the unit structure 106 satisfies conditional expression (13) below.

$$0 < W < \lambda\text{ref2}/(n0(\sin|\theta|\text{max}+1)) \quad (13)$$

Conditional expression (13) indicates a condition to prevent an occurrence of the diffraction at the center reflection wavelength λref2 when a ray is incident at an angle of |θ|max. If conditional expression (13) is not satisfied, the reflection diffraction occurs at the angle of |θ|max, which is not preferable.

In this embodiment, at least one of the first multilayer film structure 102 and the second multilayer film structure 103 in the optical filter 100 may include a ripple reduction layer. For example, the optical filter 100 can provide an optical layer (fifth optical layer) as the ripple reduction layer included in the first multilayer film structure 102 or the second multilayer film structure 103. As the ripple reduction layer, two or more optical layers may be formed in at least one of the first multilayer film structure 102 and the second multilayer film structure 103. In this embodiment, the first multilayer film structure 102 is described as a structure with a one-dimensional periodicity, but the embodiment is not limited thereto. This embodiment can be applied also to an alternate multilayer film structure with a two-dimensional periodicity to form gratings arranged in the XY in-plane direction (in two dimensions) because it serves as an optical filter which reduces the incident angle dependency in the XZ plane and YZ plane.

FIGS. 6A to 6D are configuration diagrams of an optical filter 600 in which the first multilayer film structure has a two-dimensional periodicity. When looking down on the multilayer film structure with the two-dimensional periodicity in the Z direction, as illustrated in FIG. 6A, it is a plan view with a concavo-convex shape. In FIG. 6A, reference numeral 601 denotes a convex region, and reference numeral 602 denotes a concave region. A unit structure of the alternate multilayer film structure with the two-dimensional periodicity has an alternate structure by the displacement D in the Y direction as well as the X direction. As illustrated in FIGS. 6B and 6C, widths of the convex region 601 and the concave region 602 in the X direction are defined as Wx1 and Wx2, respectively, and widths of the convex region 601 and the concave region 602 in the Y direction are defined as Wy1 and Wy2, respectively. In this case, as illustrated in FIG. 6D, four multilayer film structures in a unit structure 605 have the respective widths Wx1, Wx2, Wy1, and Wy2, and are displaced from each other by D in the Z direction to be disposed to form a concavo-convex shape, and accordingly a plan view when looking down on the unit structure 605 in the Z direction is a rectangular shape. Cross-sectional shapes cut out at the XZ plane and the YZ plane are shapes 603 and 604 illustrated in FIGS. 6B and 6C, respectively. In this case, similarly to the tilt angle φ, tilt angles φX and φY are defined by expressions (3a'), (3b'), (3a"), and (3b") below by using the widths Wx1, Wx2, Wy1, and Wy2.

$$\varphi X = \tan^{-1}(|D|/(0.5(Wx1+Wx2)))(|D| \leq 0.5(dL1+dH1)) \quad (3a')$$

$$\varphi X = \tan^{-1}(((dL1+dH1)-|D|)/(0.5(Wx1+Wx2))) \\ (|D| > 0.5(dL1+dH1)) \quad (3b')$$

$$\varphi Y = \tan^{-1}(|D|/(0.5(Wy1+Wy2)))(|D| \leq 0.5(dL1+dH1)) \quad (3a'')$$

$$\varphi Y = \tan^{-1}(((dL1+dH1)-|D|)/(0.5(Wy1+Wy2)))(|D| > 0.5 \\ (dL1+dH1)) \quad (3b'')$$

In order to reduce the incident angle dependency, it is preferred that the tilt angles φX and φY which are defined for the X and Y directions satisfy conditional expressions (1') and (1") below, respectively.

$$15 \text{ deg.} < \varphi X < 55 \text{ deg.} \quad (1')$$

$$15 \text{ deg.} < \varphi Y < 55 \text{ deg.} \quad (1'')$$

The structure described above is preferable in order to reduce the incident angle dependency in each of the XZ plane and YZ plane.

A fine device structure which constitutes the optical filter 100 in this embodiment is for example manufactured by being laminated on a substrate where a fine fabrication is applied. As a method of the fine fabrication, there is a typical etching technology, a nanoimprint technology, or the like. As a film forming method of the lamination, a typical evaporation method or spattering method is used. While a cross-sectional shape is different from a rectangle, an autocloning technology in which zigzag-shaped diffraction gratings are laminated in a multiple way by repeating the lamination and the etching may be used. This embodiment is not limited to the manufacturing methods described above, but a method of a fine concavo-convex fabrication or a film forming method of the lamination suitable in this embodiment may be used. It is assumed that a shape may be collapsed from a rectangle shape as approaching a surface layer due to a lateral deposition according to the film forming method of the lamination, but the tilt angle φ is always defined as represented by expression (3) by using the widths W1 and W2 at the lowest layer and the displacement D in the Z axis direction at the lowest layer.

Embodiment 1

Next, an optical filter in Embodiment 1 of the present invention will be described. The optical filter of this embodiment that reflects a green-band light beam is designed to reduce a wavelength shift within an incident angle range of 45±15 deg., and for example it is used as a white spectral dichroic filter in a liquid crystal projector. Hereinafter, a blue band, a green band, and a red band means 400 to 500 nm, 500 to 600 nm, and 600 to 700 nm, respectively, but each of the bands is not exactly limited to the wavelength band described above.

A configuration of an optical filter 100 in this embodiment is as illustrated in FIG. 1A, and accordingly descriptions thereof are omitted. The optical filter 100 includes a first multilayer film structure 102 and a second multilayer film structure 103 on respective surfaces of a substrate 101 constituted by a synthetic quartz having a refractive index ns=1.47. The first multilayer film structure 102 has a structure in which an optical layer 104 (first optical layer) of $TiO_2$ having a refractive index nH1=2.36 and an optical layer 105 (second optical layer) of $SiO_2$ having a refractive index nL1=1.47 are laminated alternately and repeatedly. An average layer thickness (physical layer thickness) dH1 of the optical layer 104 is 109 nm, and an average layer thickness (physical layer thickness) dL1 of the optical layer 105 is 43 nm. The optical filter 100 is configured by laminating the optical layer 104 and the optical layer 105 alternately and repeatedly eight times. The optical filter 100 includes a plurality of unit structures 106 each including a multilayer film structure with a width W1=W2=135 nm that is disposed in an X direction while being shifted by a displacement D=(dL1+dH1)/2=81 nm in a Z direction. A shape of the unit structure 106 in a Y direction is uniform. As described above, the optical filter 100 is configured by arranging the plurality of unit structures 106 on the substrate 101 to be a one-dimensional grating in the X direction. Structural parameters of the first multilayer film structure 102 are listed in Table 2 (A).

The second multilayer film structure 103 is configured by a plurality of layers having two or more types of different optical layer thicknesses in order to remove a ripple. Structural parameters relating to repetitive layers are listed in Table 2 (B). Structural parameters relating to an entire configuration are listed in Table 2 (C). The repetitive layers are constituted by an optical layer 107 (third optical layer) of $TiO_2$ having a refractive index nH2=2.36 and an optical layer 108 (fourth optical layer) of $Al_2O_3$ having a refractive index nL2=1.62. An average layer thickness (physical layer thickness) dH2 of the optical layer 107 is 102 nm, and an average layer thickness (physical layer thickness) dL2 of the optical layer 108 is 28 nm. The optical filter 100 is configured by laminating the optical layer 107 and the optical layer 108 alternately and repeatedly twelve times. FIG. 1A illustrates a structure in which each optical layer is laminated on the substrate 101 where patterning of a rectangular one-dimensional grating is applied, but it is not necessarily apply the patterning on the substrate 101.

Figure 7A:
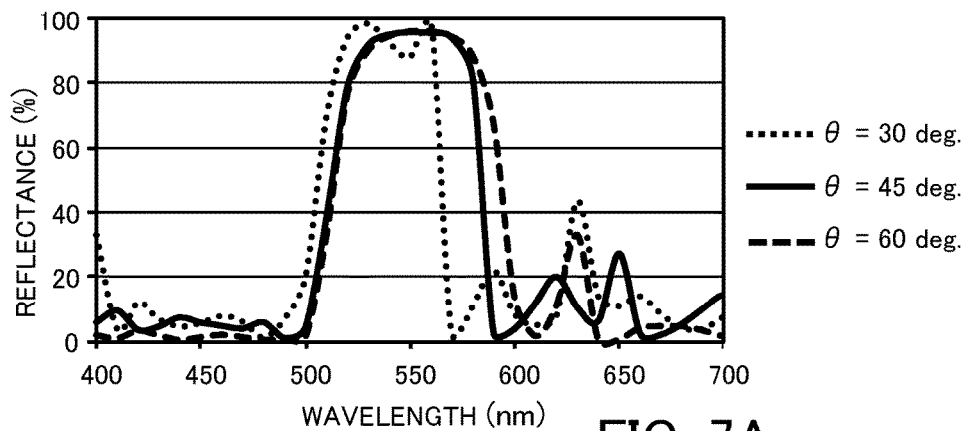
FIGS. 7A to 7C are diagrams of illustrating incident angle dependencies of spectrum reflectances of an optical filter in Embodiment 1.
Figure 7B:
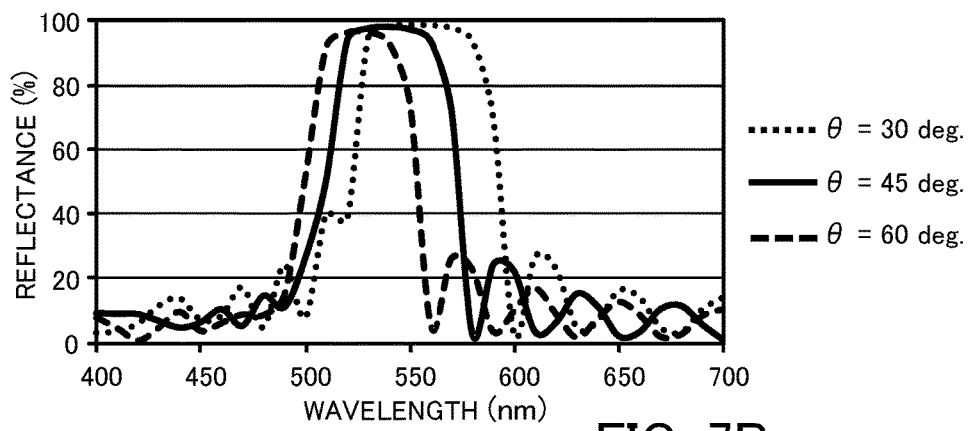
Figure 7C:
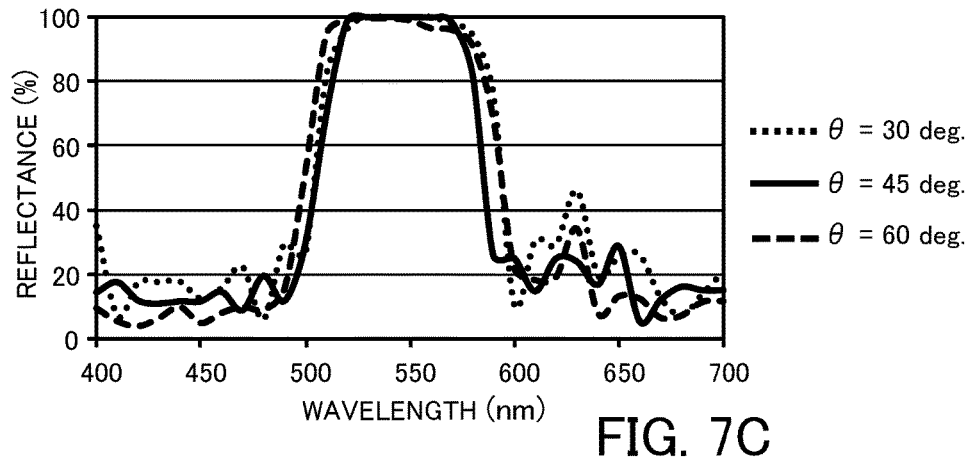

Subsequently, referring to FIGS. 7A to 7C, a reflectance spectrum of the green-band reflection dichroic filter in this embodiment will be described. FIGS. 7A to 7C are incident angle dependencies of spectrum reflectances of the first multilayer film structure 102, the second multilayer film structure 103, and a structure of the combination of the first multilayer film structure 102 and the second multilayer film structure 103 of the optical filter 100 in this embodiment, respectively. In each of FIGS. 7A to 7C, a horizontal axis indicates a wavelength (nm) and a vertical axis indicates a reflectance (%). The incident plane is an XZ plane, and polarized light is a P-polarized light (TM polarized light). As illustrated in FIG. 7C, a center reflection wavelength at the incident angle θ=45 deg. is 550 nm, which has a reflectance not less than 90% and has a reflection band with a full width at half maximum of 100 nm.

Figure 8A:
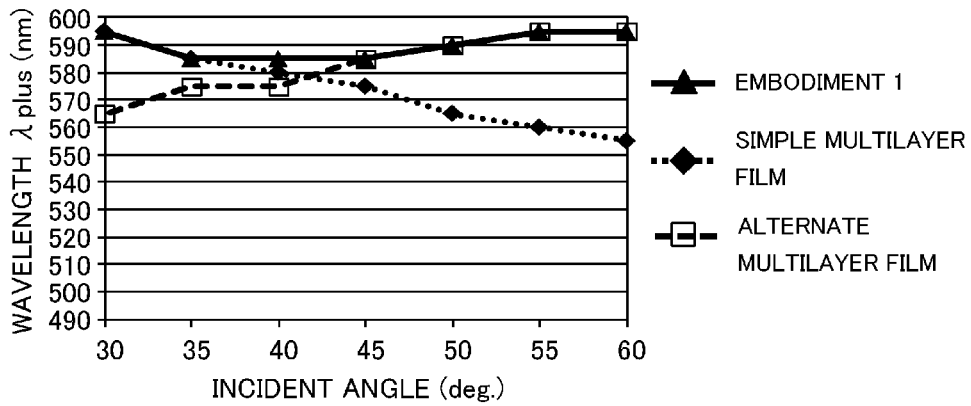
FIGS. 8A to 8C are diagrams of illustrating incident angle dependencies of reflection wavelengths in multilayer film structures constituting the optical filter in Embodiment 1.
Figure 8B:
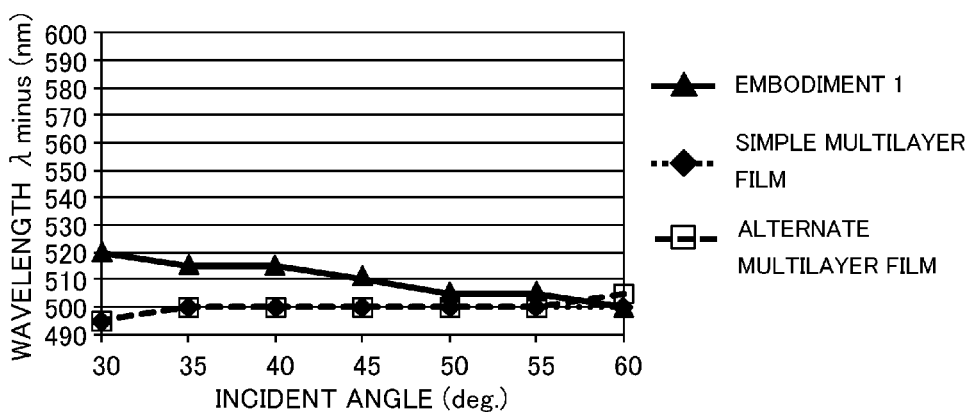
Figure 8C:
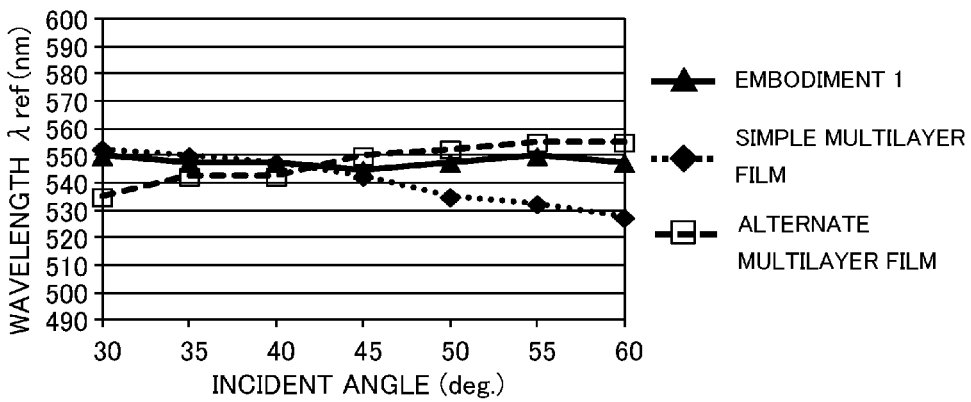

FIGS. 8A to 8C are incident angle dependencies of the respective reflection wavelengths of the first multilayer film structure 102 (alternate multilayer film), the second multilayer film structure 103 (simple multilayer film), and the optical filter 100 (Embodiment 1) which is obtained by combining the first multilayer film structure 102 and the second multilayer film structure 103. FIGS. 8A to 8C illustrate the incident angle dependencies of wavelengths λplus, λminus, and λref, respectively. The wavelength λplus is defined as a wavelength at the foot on the long wavelength side having a reflectance of 50%, the wavelength λminus is defined as a wavelength at the foot on the short wavelength side having a reflectance of 50%, and the wavelength λref is defined as the midpoint of the wavelengths λplus and λminus. By combining the first multilayer film structure 102 with the second multilayer film structure 103, the wavelength λplus of the optical filter 100 is approximately the same as the wavelength λplus at the longer wavelength side with respect to the first multilayer film structure 102 and the second multilayer film structure 103. Similarly, the wavelength λminus of the optical filter 100 is approximately the same as the wavelength λminus at the shorter wavelength side with respect to the first multilayer film structure 102 and the second multilayer film structure 103. As described above, the incident angle dependency of the wavelength λref in the optical filter 100 is effectively reduced in accordance with the relationship between the wavelengths λplus and λminus in the optical filter 100. For example, the wavelength λref caused by a change (incident angle change) from the incident angle θ=30 deg. to 60 deg. is 5 nm. In accordance with the relationship between the incident angle change and a wavelength shift amount, the wavelength λedge corresponds to λplus, and Δλedge/n0 is 10 nm as illustrated in FIG. 8C.

Figure 9:
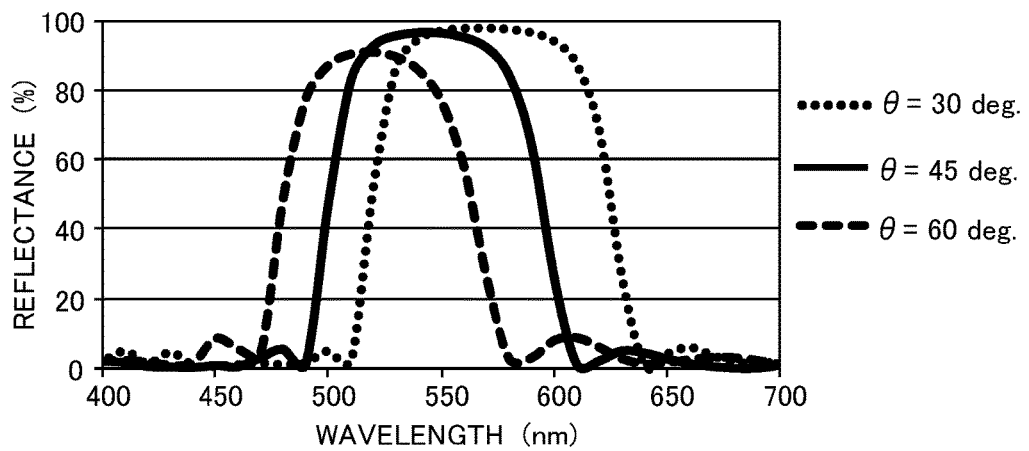
FIG. 9 is a diagram of illustrating an incident angle dependency of a spectrum reflectance of an optical filter in comparative example 1A.
Figure 10:
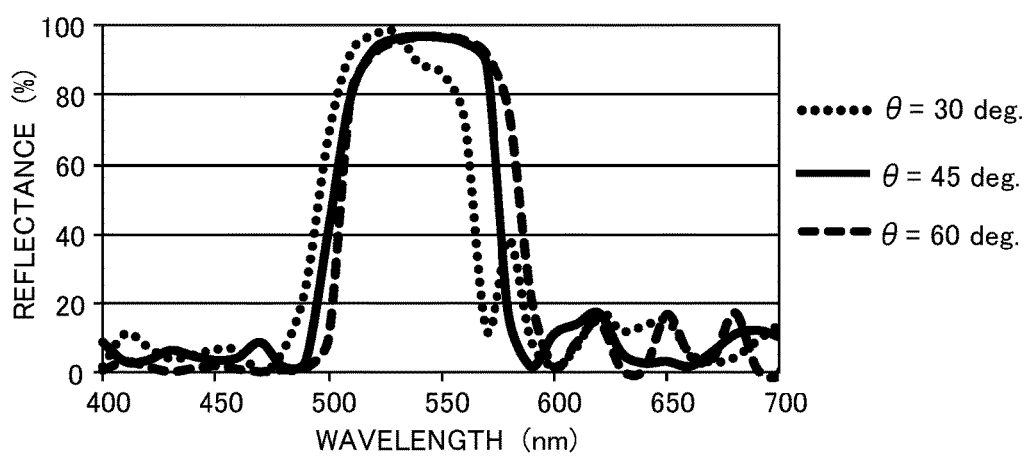
FIG. 10 is a diagram of illustrating an incident angle dependency of a spectrum reflectance of an optical filter in comparative example 1B.

As comparative example 1A, FIG. 9 illustrates an incident angle dependency of a reflection spectrum of a dichroic filter, which is constituted by a simple multilayer film corresponding to the second multilayer film structure 103, for reflecting a green-band light beam at an incident angle of θ=45 deg. According to FIG. 9, a shift amount Δλedge is −50 nm. As comparative example 1B, FIG. 10 is an incident angle dependency of a reflection spectrum of a dichroic filter, which is constituted only by an alternate multilayer film corresponding to the first multilayer film structure 102, for reflecting a green-band light beam at an incident angle of θ=45 deg. Structural parameters in comparative example 1B are listed in Table 3. According to FIG. 10, the shift amount Δλedge is 25 nm. As described above, this embodiment can reduce a shift of the reflection wavelength compared with each of comparative examples 1A and 1B.

Values (numerical example) for each conditional expression in this embodiment are listed in Table 2 (D). A tilt angle φ of the unit structure 106 is 29.4 deg., which satisfies conditional expression (1). A value of nH1dH1/nL1dL1 is 4.06, which satisfies conditional expression (2). Each of conditional expressions (4) and (5) is also satisfied. When a ray is incident at an angle represented by a minimum value |θ|min, the first multilayer film structure 102 reflects a ray in a short wavelength band compared with the second multilayer film structure 103. On the other hand, when the ray is incident at an angle represented by a maximum value |θ|max, the first multilayer film structure 102 reflects a ray in a long wavelength band compared with the second multilayer film structure 103. Satisfying this is understood based on the relationship between wavelengths λref1 and λref2 at the incident angles of the minimum value |θ|min and the maximum value |θ|max in FIG. 9. Satisfying the relationship of conditional expressions (8), (10), (12), and (13) are listed in Table (D). Based on the result of FIG. 7C, conditional expression (11) relating to Δλedge is also satisfied. This embodiment is not limited to parameters (structural parameters) listed in Table 2. A dichroic filter which reflects a blue-band or red-band light beam, as well as the green-band light beam, can be designed by performing approximately-constant multiplication of parameters of dH1, dL1, W1, W2, D, dH2, and dL2 in the structural parameters.

Embodiment 2

Next, an optical filter in Embodiment 2 of the present invention will be described. The optical filter of this embodiment that reflects a blue-band light beam is designed to reduce a wavelength shift within an incident angle range of 45±15 deg., and for example it is used as a dichroic filter of a white spectral prism in a three-board type image pickup apparatus.

Figure 11:
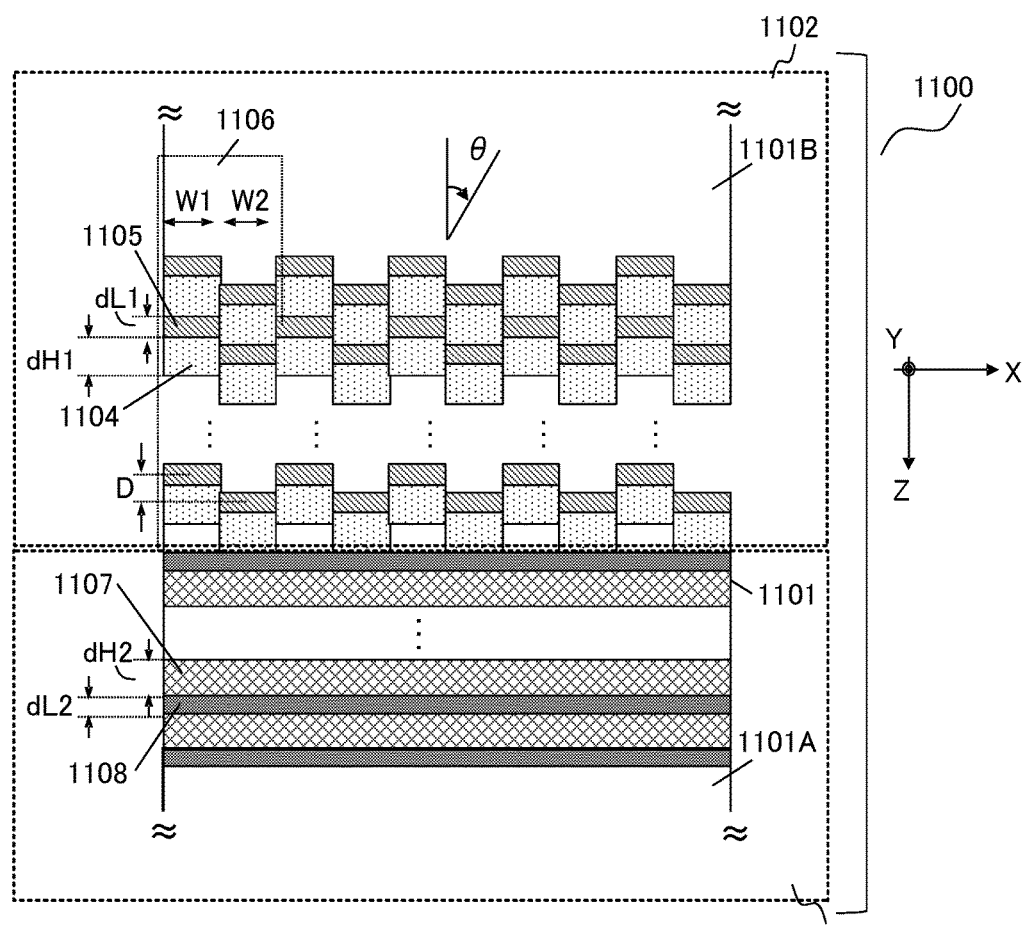
FIG. 11 is a configuration diagram of an optical filter in each of Embodiments 2 and 3.

Referring to FIG. 11, a configuration of an optical filter (optical element) in this embodiment will be described. FIG. 11 is a configuration diagram of an optical filter 1100. The optical filter 1100 has a structure in which two structures of a first multilayer film structure 1102 and a second multilayer film structure 1103 are laminated on a substrate 1101A (first substrate) of a synthetic quartz having a refractive index ns=1.47. At a side opposite to the joint surface of the substrate 1101A, a substrate 1101B (second substrate) is joined to the first multilayer film structure 1102 above the substrate 1101A. As described above, in this embodiment, the first multilayer film structure 1102 and the second multilayer structure 1103 are provided between the substrate 1101A and the substrate 1101B.

The first multilayer film structure 1102 has a structure in which an optical layer 1104 (first optical layer) of $TiO_2$ having a refractive index nH1=2.36 and an optical layer 1105 (second optical layer) of $SiO_2$ having a refractive index nL1=1.47 are laminated alternately and repeatedly. An average layer thickness (physical layer thickness) dH1 of the optical layer 1104 is 95 nm, and an average layer thickness (physical layer thickness) dL1 of the optical layer 1105 is 90 nm. The optical filter 1100 is configured by laminating the optical layer 1104 and the optical layer 1105 alternately and repeatedly ten times. The optical filter 1100 includes a plurality of unit structures 1106 each including a multilayer film structure with a width W1=W2=77.5 nm that is disposed in an X direction while being displaced by a displacement D=(dL1+dH1)/2=92.5 nm in a Z direction. A shape of the unit structure 1106 in a Y direction is uniform. As described above, the optical filter 1100 is configured by arranging the plurality of unit structures 1106 on the substrate 1101 to be a one-dimensional grating in the X direction. Structural parameters of the first multilayer film structure 1102 are listed in Table 4 (A).

The second multilayer film structure 1103 is configured by layers having two or more types of different optical layer thicknesses in order to remove a ripple. Structural parameters relating to repetitive layers are listed in Table 4 (B), and structural parameters relating to an entire configuration are listed in Table 4 (C). The optical layers as the repetitive layers are constituted by an optical layer 1107 (third optical layer) of $TiO_2$ having a refractive index nH2=2.36 and an optical layer 1108 (fourth optical layer) of $Al_2O_3$ having a refractive index nL2=1.62. An average layer thickness (physical layer thickness) dH2 of the optical layer 1107 is 102 nm, and an average layer thickness (physical layer thickness) dL2 of the optical layer 1108 is 28 nm. The optical filter 1100 is configured by laminating the optical layer 1107 and the optical layer 1108 alternately and repeatedly ten times.

Figure 12A:
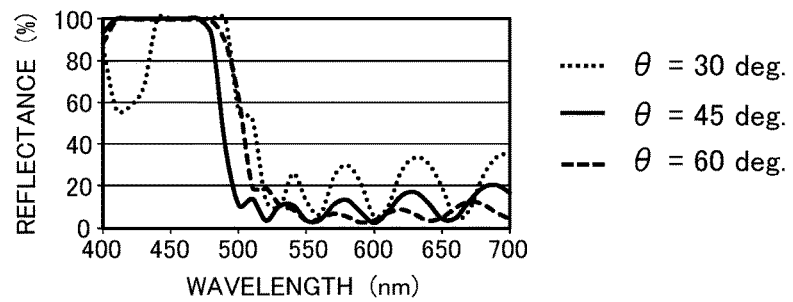
FIGS. 12A to 12E are diagrams of illustrating incident angle dependencies of spectrum reflectances of the optical filter in Embodiment 2.
Figure 12B:
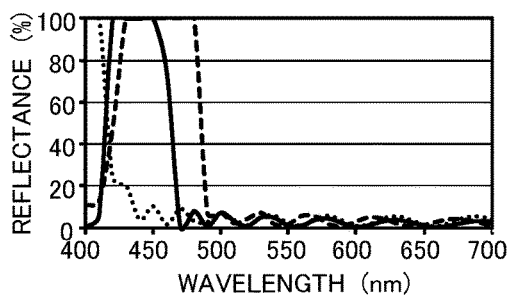
Figure 12D:
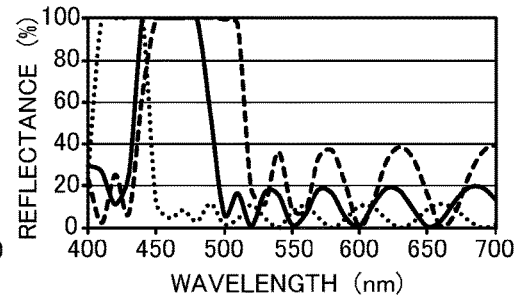
Figure 12C:
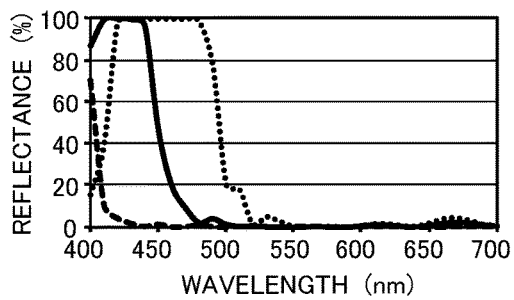
Figure 12E:
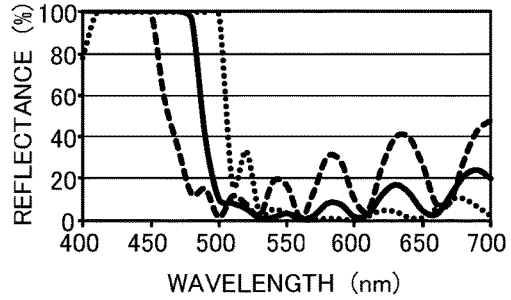

Subsequently, referring to FIGS. 12A to 12E, a reflectance spectrum of a green-band reflection dichroic filter in this embodiment will be described. FIG. 12A is an incident angle dependency of the spectrum reflectance in a combination of the first multilayer film structure 1102 and the second multilayer film structure 1103 of the optical filter 1100 in this embodiment. FIG. 12A illustrates an average of a P-polarized light incidence and an S-polarized light incidence. FIGS. 12B and 12C are incident angle dependencies of the spectrum reflectances in the first multilayer film structure 1102 for the P-polarized light incidence and the S-polarized light incidence, respectively. FIGS. 12D and 12E are incident angle dependencies of the spectrum reflectances in the second multilayer film structure 1103 for the P-polarized light incidence and the S-polarized light incidence, respectively. An incident plane is an XZ plane. As illustrated in FIG. 12A, it has a reflection band centered around 430 nm at a center incident angle of θ0=45 deg. Within an incident angle range from θ=30 deg. to 60 deg., Δλedge/n0=20 nm is satisfied.

Figure 13:
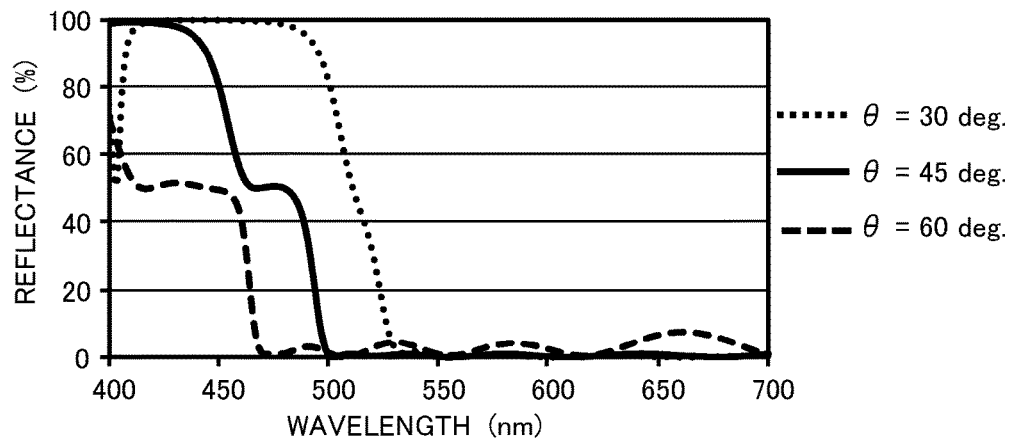
FIG. 13 is a diagram of illustrating an incident angle dependency of a spectrum reflectance in comparative example 2.
Figure 14:
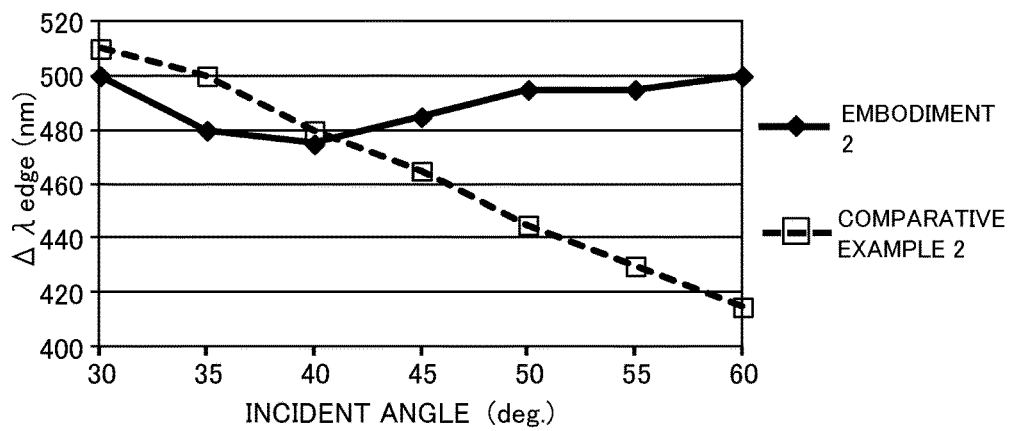
FIG. 14 is a diagram of illustrating incident angle dependencies of a reflection wavelength λedge of the optical filter in each of Embodiment 2 and comparative example 2.

As comparative example 2, FIG. 13 illustrates an incident angle dependency of the reflection spectrum of a dichroic filter, constituted by a simple multilayer film without an in-plane fine shape, for reflecting a blue-band light beam which is incident at an angle of θ=45 deg. Parameters relating to the configuration of the optical filter in comparative example 2 are listed in Table 5. FIG. 14 illustrates a result of the incident angle dependencies of the reflection wavelength λedge in this embodiment and comparative example 2. This embodiment can effective reduce Δλedge compared with comparative example 2.

Values of each conditional expression in this embodiment are listed in Table 4 (D). A tilt angle φ of the unit structure 1106 is 50.4 deg., which satisfies conditional expression (1). A value of nH1dH1/nL1dL1 is 4.06, which satisfies conditional expression (2). Each of conditional expressions (4) and (5) is also satisfied. When a ray is incident at an angle represented by a minimum value 101 min, the first multilayer film structure 1102 reflects a ray in a short wavelength band compared with the second multilayer film structure 1103. On the other hand, when the ray is incident at an angle represented by a maximum value |θ|max, the first multilayer film structure 1102 reflects a ray in a long wavelength band compared with the second multilayer film structure 1103. Satisfying this is understood based on the relationship between wavelengths λref1 and λref2 at the incident angles of the minimum value |θ|min and the maximum value |θ|max in FIGS. 12A to 12E. Satisfying the relationship of conditional expressions (8), (10), (12), and (13) are listed in Table 4 (D). Based on the result of FIGS. 12A to 12E, conditional expression (11) relating to Δλedge is also satisfied. This embodiment is not limited to parameters (structural parameters) listed in Table 4. A dichroic filter which reflects a green-band or red-band light beam, as well as the blue-band light beam, can be designed by performing approximately-constant multiplication of parameters of dH1, dL1, W1, W2, D, dH2, and dL2 in the structural parameters.

Embodiment 3

Next, an optical filter in Embodiment 3 of the present invention will be described. The optical filter of this embodiment that reflects a blue-band light beam is designed to reduce a wavelength shift within an incident angle range of 30±15 deg., and for example it is used as a dichroic filter of a white spectral prism in a three-board type image pickup apparatus.

A basic configuration of an optical filter 1100 in this embodiment is as illustrated in FIG. 11. Therefore, descriptions common to those in Embodiment 2 are omitted. An average layer thickness (physical layer thickness) dH1 of an optical layer 1104 is 100 nm, and an average layer thickness (physical layer thickness) dL1 of an optical layer 1105 is 70 nm. The optical filter 1100 is configured by laminating the optical layer 1104 and the optical layer 1105 alternately and repeatedly eleven times. The optical filter 1100 includes a plurality of unit structures 1106 each including a multilayer film structure with a width W1=W2=85 nm that is disposed in an X direction while being shifted by a displacement D=(dL1+dH1)/2=85 nm in a Z direction. An average layer thickness (physical layer thickness) dH2 of an optical layer 1107 is 55 nm, and an average layer thickness (physical layer thickness) dL2 of an optical layer 1108 is 55 nm. The optical layer 1107 and the optical layer 1108 are laminated alternately and repeatedly fifteen times.

Figure 15A:
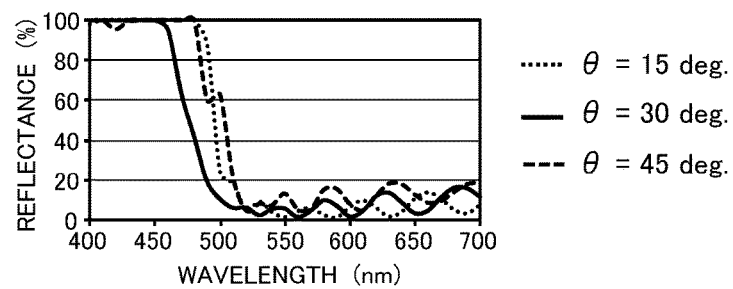
FIGS. 15A to 15E are diagrams of illustrating incident angle dependencies of spectrum reflectances of an optical filter in Embodiment 3.
Figure 15B:
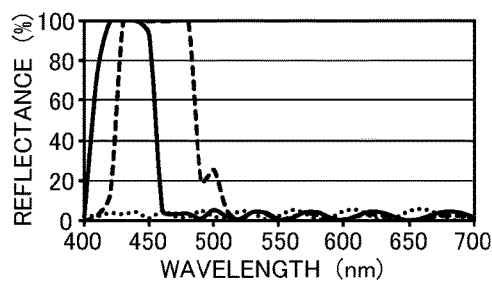
Figure 15D:
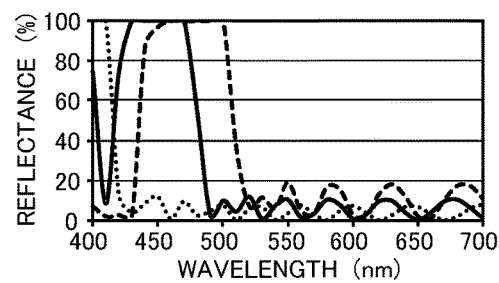
Figure 15C:
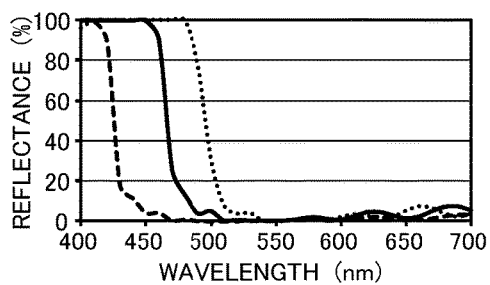
Figure 15E:
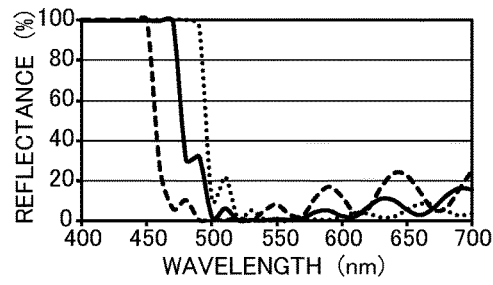

Subsequently, referring to FIGS. 15A to 15E, a reflectance spectrum of a blue-band reflection dichroic filter in this embodiment will be described. FIG. 15A is an incident angle dependency of the spectrum reflectance in a combination of a first multilayer film structure 1102 and a second multilayer film structure 1103 of the optical filter 1100 in this embodiment. FIG. 15A illustrates an average of a P-polarized light incidence and an S-polarized light incidence. FIGS. 15B and 15C are incident angle dependencies of the spectrum reflectances in the first multilayer film structure 1102 for the P-polarized light incidence and the S-polarized light incidence, respectively. FIGS. 15D and 15E are incident angle dependencies of the spectrum reflectances in the second multilayer film structure 1103 for the P-polarized light incidence and the S-polarized light incidence, respectively. An incident plane is an XZ plane. As illustrated in FIG. 15A, it has a reflection band centered around 430 nm at a center incident angle of θ0=30 deg. Within an incident angle range from θ=15 deg. to 45 deg., Δλedge/n0=20 nm is satisfied.

Values of each conditional expression in this embodiment are listed in Table 4 (D). A tilt angle φ of the unit structure 1106 is 50.4 deg., which satisfies conditional expression (1). A value of nH1dH1/nL1dL1 is 4.06, which satisfies conditional expression (2). Each of conditional expressions (4) and (5) is also satisfied. When a ray is incident at an angle represented by a minimum value |θ|min, the first multilayer film structure 1102 reflects a ray in a short wavelength band compared with the second multilayer film structure 1103. On the other hand, when the ray is incident at an angle represented by a maximum value |θ|max, the first multilayer film structure 1102 reflects a ray in a long wavelength band compared with the second multilayer film structure 1103. Satisfying this is understood based on the relationship between wavelengths λref1 and λref2 at the incident angles of the minimum value |θ|min and the maximum value |θ|max in FIGS. 15A to 15E. Satisfying the relationship of conditional expressions (8), (10), (12), and (13) are listed in Table 4 (D). Based on the result of FIG. 15A, conditional expression (11) relating to Δλedge is also satisfied. This embodiment is not limited to parameters (structural parameters) listed in Table 4. A dichroic filter which reflects a green-band or red-band light beam, as well as the blue-band light beam, can be designed by performing approximately-constant multiplication of parameters of dH1, dL1, W1, W2, D, dH2, and dL2 in the structural parameters.

Embodiment 4

Figure 16:
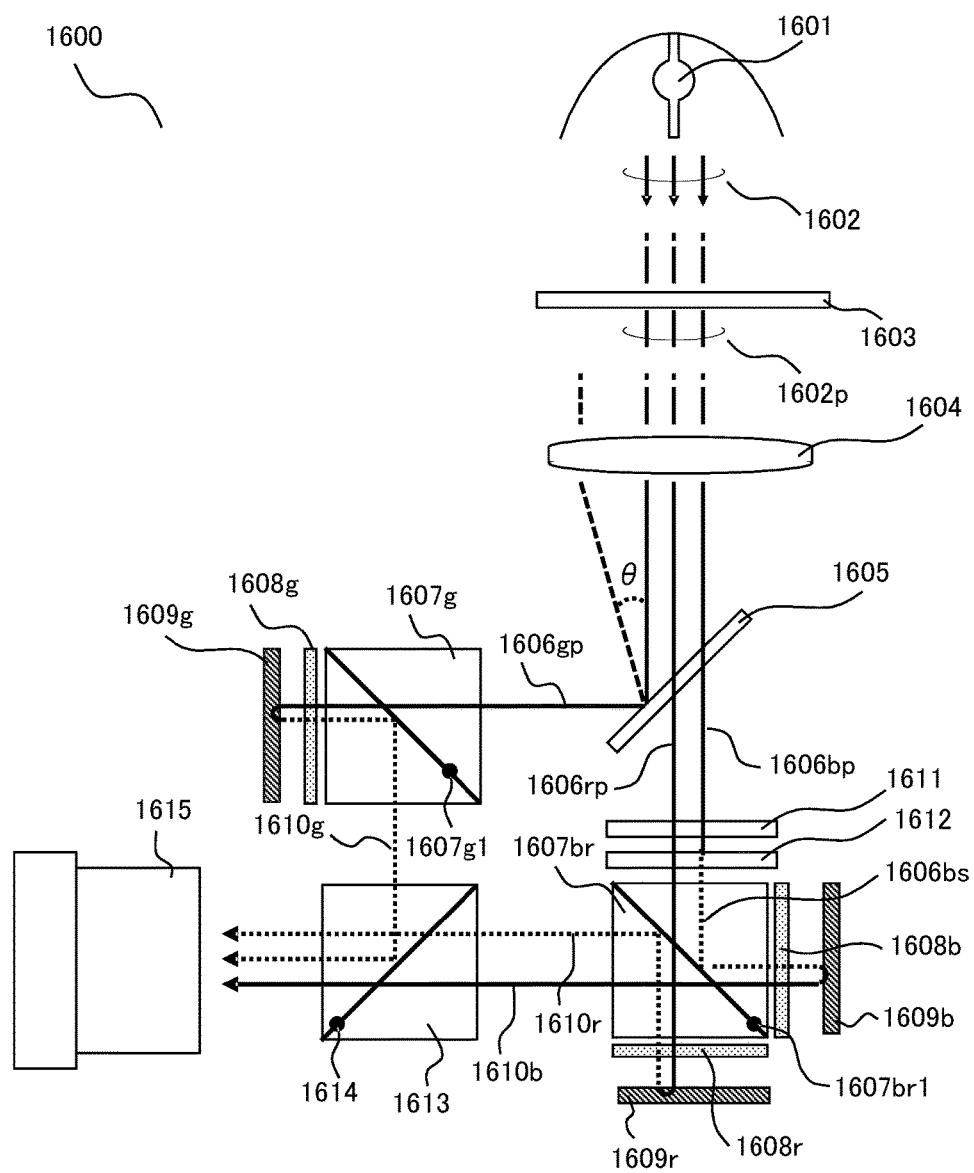
FIG. 16 is a configuration diagram of an image display apparatus in Embodiment 4.

Next, referring to FIG. 16, an image display apparatus (optical apparatus) in Embodiment 4 of the present invention will be described. FIG. 16 is a configuration diagram of an image display apparatus 1600.

The image display apparatus 1600 includes a light source 1601, a polarizer 1603, a lens 1604, a dichroic filter 1605, a polarizing beam splitter 1607, a phase compensation plate 1608, an image display element 1609, a polarization plate 1611, and a color selective phase plate 1612. In this configuration, the image display apparatus 1600 can generate image light. The image display apparatus 1600 further includes a synthesizing prism 1613, a dichroic film 1614, and a projection optical system 1615, and it synthesizes and projects image light in each band.

An illumination light beam 1602 emitted from the light source 1601 is incident on the polarizer 1603 to be a P-polarized illumination light beam 1602p. Next, the illumination light beam 1602p is condensed by the lens 1604 and then it is incident on the dichroic filter 1605 which reflects a light beam in a green band. The light beam is incident on the green-band-reflection dichroic filter 1605 at a half opening angle as an angle θ by condensing the light. A blue-band light beam 1606bp and a red-band light beam 1606rp transmit through the dichroic filter 1605.

A green-band light beam 1606gp is reflected by the dichroic filter 1605, and it is incident on a polarizing beam splitter 1607g. The polarizing beam splitter 1607g is an element where P-polarized light transmits and S-polarized light beam is reflected in polarized light which is incident on a polarizing beam splitting surface 1607g1, and it causes the green-band light beam 1606gp to transmit. The green-band light beam 1606gp is converted into a distribution including image information by illumination onto a phase compensation plate 1608g and an image display element 1609g. Furthermore, the green-band light beam 1606gp becomes S-polarized light as green-band light beam 1610g by polarizing conversion. Then, the image light 1610g is incident on the polarizing beam splitter 1607g again, and it is reflected by the polarizing beam splitting surface 1607g1. Accordingly, the image light 1610g is emitted to an optical path different from an incident optical path to advance in a direction toward the synthesizing prism 1613.

Each of the blue-band light beam 1606bp and the red-band light beam 1606rp is improved in degree of polarization by transmitting through the polarization plate 1611, and then it is incident on the color selective phase plate 1612.

The color selective phase plate 1612 has characteristics of converting only a polarization direction of the blue-band light beam by 90 degrees. As a result, the blue-band light beam and the red-band light beam are incident on a polarizing beam splitter 1607br in a state where the polarization direction of the blue-band light beam is rotated by 90 degrees (as a blue-band light beam 1606bs) while the polarization state of the red-band light beam is maintained. The polarizing beam splitter 1607br is an element where P-polarized light transmits and S-polarized light is reflected in the polarized light which is incident on a polarizing beam splitting surface 1607br1. The element having such a function can be obtained for example by laminating thin films with different refractive indices on the polarizing beam splitting surface 1607br1. The blue-band light beam 1606bs is reflected on the polarizing beam splitting surface 1607br1 of the polarizing beam splitter 1607br and the red-band light beam 1606rp transmits through the polarizing beam splitting surface 1607br1 to perform a color separation.

The blue-band light beam 1606bs and the red-band light beam 1606rp transmit through phase compensation plates 1608b and 1608r, respectively, and then they are illuminated on image display elements 1609b and 1609r corresponding to the respective colors to be converted into distributions including image information. These image lights transmit through the phase compensation plates 1608b and 1608r again, and then they are incident on the polarizing beam splitter 1607br again. Image light 1610b corresponding to the blue-band light beam transmits through the polarizing beam splitting surface 1607br1. Image light 1610r corresponding to the red-band light beam transmits through the polarizing beam splitting surface 1607br1. As a result, the image lights 1610b and 1610r are synthesized to be incident on the synthesizing prism 1613. Image light 1610g corresponding to the green-band light beam is reflected by the dichroic film 1614 in the synthesizing prism 1613, and the image light 1610b corresponding to the blue-band light beam and the image light 1610r corresponding to the red-band light beam transmit through the dichroic film 1614, and thus lights in blue, green, and red bands are synthesized to be emitted. The image light obtained by the color synthesis is projected and imaged by the projection optical system 1615.

In the image display apparatus 1600, a white light beam with the angle θ as a half opening angle is incident on the dichroic filter 1605 for the green-band reflection and the dichroic film 1614. For example, the optical filter 100 in Embodiment 1 can be used as the dichroic filter 1605 for the green-band reflection, and the optical filter 1100 in Embodiment 2 can be used as the dichroic film 1614. Accordingly, a change in hue, which is generated in a conventional multilayer film, caused by a change of a wavelength depending on an incident angle can be reduced.

Embodiment 5

Figure 17:
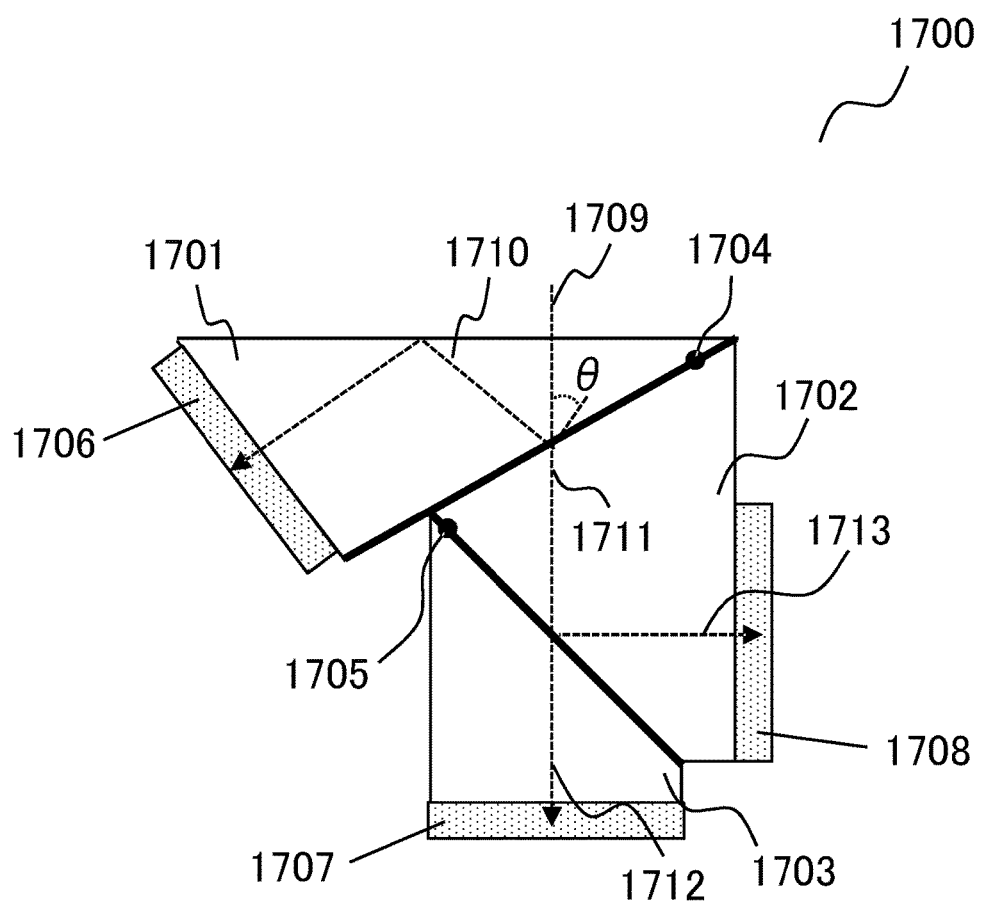
FIG. 17 is a configuration diagram of an image pickup apparatus in Embodiment 5.

Next, referring to FIG. 17, an image pickup apparatus (optical apparatus) in Embodiment 5 of the present invention will be described. FIG. 17 is a configuration diagram of an image pickup apparatus 1700.

The image pickup apparatus 1700 includes a first prism 1701, a second prism 1702, and a third prism 1703. Each prism is joined, and a green reflection dichroic film 1704 is provided on a joint surface of the first prism 1701 and the second prism 1702. A blue reflection dichroic film 1705 is provided on a joint surface of the second prism 1702 and the third prism 1703. Image light split by each joint surface is incident on a green image pickup element 1706, a red image pickup element 1707, and a blue image pickup element 1708, and thus spectroscopic imaging can be performed.

White image light 1709 entering the image pickup apparatus 1700 is incident on the green reflection dichroic film 1704 to be split into green image light 1710 and red and blue image light 1711. The green image light 1710 reflected by the green reflection dichroic film 1704 is reflected by an interface between the first prism 1701 and air to be incident on the green image pickup element 1706. The red and blue image light 1711 transmitting through the green reflection dichroic film 1704 is split into red image light 1712 and blue image light 1713 by the blue reflection dichroic film 1705. The red image light 1712 transmitting through the blue reflection dichroic film 1705 is incident on the red image pickup element 1707. The blue image light 1713 reflected by the blue reflection dichroic film 1705 is incident on the blue image pickup element 1708. An image obtained by the spectroscopic imaging can be constituted based on image light information of each of colors from the image pickup elements obtained as described above.

In the image pickup apparatus 1700, the white image light with a half opening angle as an angle θ is incident on the blue reflection dichroic film 1705. As the blue reflection dichroic film 1705, for example the optical filter 1100 in Embodiment 2 or Embodiment 3 is used. Accordingly, a change in hue, which is generated in a conventional multilayer film, caused by a change of a wavelength depending on an incident angle can be reduced. While this embodiment is described referring to FIG. 17, a type of each image pickup element, characteristics such as a wavelength band of each image pickup element, an arrangement angle of each image pickup element with respect to a ray, and the like are not limited thereto. The blue reflection dichroic film 1705 is arranged at an angle of 45 deg. with respect to a ray incident angle in FIG. 17, and instead for example it may be arranged at 30 deg.

As described above, the optical filter in each embodiment is configured by combining the alternate multilayer film structure with the displacement in the lamination direction and the simple multilayer film structure without the in-plane fine structure. According to each embodiment, an optical filter and an optical apparatus which are capable of reducing a change in reflection wavelength within a desired incident angle range can be provided. Furthermore, according to each embodiment, an optical apparatus which is capable of suppressing a deterioration in hue can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, the first multilayer film structure may include a layer other than the first and second optical layers. Similarly, the second multilayer film structure may include a layer other than the third and fourth optical layers. In this case, the first and second multilayer film structures may be configured by disposing the additional layer (other layer) between the first optical layer and the second optical layer, or between the third optical layer and the fourth optical layer, respectively.

This application claims the benefit of Japanese Patent Application No. 2015-056418, filed on Mar. 19, 2015, which is hereby incorporated by reference herein in its entirety.

TABLE 1

|  | dH (nm) | nH | dL (nm) | nL | ns | NUMBER OF REPETITIONS m |
|---|---|---|---|---|---|---|
| SIMPLE MULTILAYER FILM | 50 | 2.36 | 80 | 1.47 | 1 | 9 |

|  | dH (nm) | nH | dL (nm) | nL | D (nm) | W1 (nm) | W2 (nm) | ns | NUMBER OF REPETITIONS m |
|---|---|---|---|---|---|---|---|---|---|
| ALTERNATE MULTILAYER FILM | 50 | 2.36 | 80 | 1.47 | 65 | 150 | 150 | 1 | 9 |

TABLE 2

(A)

|  | CENTER REFLECTION WAVELENGTH (nm) | dH1 (nm) | nH1 | dL1 (nm) | nL1 | D (nm) | W = W1 + W2 (nm) | W1 (nm) | W2 (nm) | φ (deg.) | NUMBER OF REPETITIONS m |
|---|---|---|---|---|---|---|---|---|---|---|---|
| EMBODIMENT 1 | 550 | 109 | 2.36 | 43 | 1.47 | 76 | 270 | 135 | 135 | 29.4 | 8 |

(B)

|  | CENTER REFLECTION WAVELENGTH (nm) | dH2 (nm) | nH2 | dL2 (nm) | nL2 | NUMBER OF REPETITIONS m | ns |
|---|---|---|---|---|---|---|---|
| EMBODIMENT 1 | 550 | 102 | 2.36 | 27 | 1.62 | 12 | 1.47 |

(C)

| LAYER | REFRACTIVE INDEX n | THICKNESS d (nm) |  |
|---|---|---|---|
| INCIDENT MEDIUM | 1.47 |  |  |
| 1 | 2.36 | 94 |  |
| 2 | 1.62 | 9 |  |
| 3 | 2.36 | 102 | ⎫ |
| 4 | 1.62 | 28 | ⎬ ×12 |
| 27 | 2.36 | 197 | ⎭ |
| EXIT MEDIUM | 1.47 |  |  |

(D)

|  | CONDITIONAL EXPRESSION |  |  |  |  |  |  |  |  |  |  |
|---|---|---|---|---|---|---|---|---|---|---|---|
|  | (1) φ | (2) nH1dH1/ nL1dL1 | (4) | (5) | (6) λ1/ λ2 | (8) D/(dL1 + dH1) | (10) W1/(W1 + W2) | (11) Δλedge (nm) | (12) | (13) UPPER LIMIT (nm) |  |  |
| EMBODIMENT 1 | 29.4 | 4.07 | 0.46 | 0.53 | 1.00 | 0.5 | 0.5 | 10 | 0.37 | 295 |  |  |

TABLE 3

|  | DESIGNED CENTER WAVELENGTH (nm) | dH1 (nm) | nH1 | dL1 (nm) | nL1 | D (nm) | W1 (nm) | W2 (nm) | ns | NUMBER OF REPETITIONS m |
|---|---|---|---|---|---|---|---|---|---|---|
| COMPARATIVE EXAMPLE 1B | 540 | 105 | 2.36 | 45 | 1.47 | 75 | 135 | 135 | 1.47 | 8 |

TABLE 4

(A)

| | CENTER REFLECTION WAVELENGTH (nm) | dH1 (nm) | nH1 | dL1 (nm) | nL1 | D (nm) | W = W1 + W2 (nm) | W1 (nm) | W2 (nm) | φ (deg.) | NUMBER OF REPETITIONS m |
|---|---|---|---|---|---|---|---|---|---|---|---|
| EMBODIMENT 2 | 430 | 95 | 2.36 | 90 | 1.47 | 92.5 | 155 | 77.5 | 77.5 | 50.4 | 10 |

(B)

| | CENTER REFLECTION WAVELENGTH (nm) | dH2 (nm) | nH2 | dL2 (nm) | nL2 | NUMBER OF REPETITIONS k | ns |
|---|---|---|---|---|---|---|---|
| EMBODIMENT 2 | 430 | 74 | 2.36 | 44 | 1.62 | 18 | 1.47 |

(C)

| LAYER | REFRACTIVE INDEX n | THICKNESS d (nm) | |
|---|---|---|---|
| INCIDENT MEDIUM | 1.47 | | |
| 1 | 2.36 | 120 | |
| 2 | 1.62 | 44 | |
| 3 | 2.36 | 74 | ×18 |
| 4 | 1.62 | 44 | |
| 27 | 2.36 | 44 | |
| EXIT MEDIUM | 1.47 | | |

(D)

| | CONDITIONAL EXPRESSION | | | | | | | | | |
|---|---|---|---|---|---|---|---|---|---|---|
| | (1) φ | (2) nH1dH1/ nL1dL1 | (4) | (5) | (6) λ1/ λ2 | (8) D/(dL1 + dH1) | (10) W1/(W1 + W2) | (11) Δλedge/ n0 (nm) | (12) | (13) UPPER LIMIT (nm) |
| EMBODIMENT 2 | 50.4 | 1.69 | 0.51 | 0.49 | 1.02 | 0.50 | 0.50 | 10 | 0.54 | 179 |

TABLE 5

| LAYER | REFRACTIVE INDEX n | THICKNESS d (nm) | |
|---|---|---|---|
| INCIDENT MEDIUM | 1.47 | | |
| 1 | 2.18 | 28.4 | |
| 2 | 1.6 | 68.1 | |
| 3 | 2.18 | 61.5 | |
| 4 | 1.6 | 73.6 | |
| 5 | 2.18 | 47.1 | |
| 6 | 1.6 | 77.0 | |
| 7 | 2.18 | 57.5 | ×4 |
| 8 | 1.6 | 73.54 | |
| 15 | 2.18 | 57.5 | |
| 16 | 1.6 | 77.0 | |
| 17 | 2.18 | 47.1 | |
| 18 | 1.6 | 73.6 | |
| 19 | 2.18 | 61.5 | |
| 20 | 1.6 | 68.1 | |
| 21 | 2.18 | 28.4 | |
| EXIT MEDIUM | 1.47 | | |

TABLE 6

(A)

| | CENTER REFLECTION WAVELENGTH (nm) | dH1 (nm) | nH1 | dL1 (nm) | nL1 | D (nm) | W = W1 + W2 (nm) | W1 (nm) | W2 (nm) | φ (deg.) | NUMBER OF REPETITIONS m |
|---|---|---|---|---|---|---|---|---|---|---|---|
| EMBODIMENT 3 | 430 | 100 | 2.36 | 70 | 1.47 | 85 | 170 | 85 | 85 | 45.0 | 11 |

TABLE 6-continued (B)

| | CENTER REFLECTION WAVELENGTH (nm) | dH2 (nm) | nH2 | dL2 (nm) | nL2 | NUMBER OF REPETITIONS k | ns |
|---|---|---|---|---|---|---|---|
| EMBODIMENT 3 | 430 | 55 | 2.36 | 55 | 1.62 | 15 | 1.47 |

(C)

| LAYER | REFRACTIVE INDEX n | THICKNESS d (nm) | |
|---|---|---|---|
| INCIDENT MEDIUM | 1.47 | | |
| 1 | 2.36 | 147 | |
| 2 | 1.62 | 55 | ⎫ |
| 3 | 2.36 | 55 | ⎬ ×15 |
| 32 | 1.62 | 29 | ⎭ |
| EXIT MEDIUM | 1.47 | | |

(D)

| | CONDITIONAL EXPRESSION | | | | | | | | | |
|---|---|---|---|---|---|---|---|---|---|---|
| | (1) $\varphi$ | (2) $nH1 dH1/nL1 dL1$ | (4) | (5) | (6) $\lambda 1/\lambda 2$ | (8) $D/(dL1+dH1)$ | (10) $W1/W1+W2)$ | (11) $\Delta\lambda\text{edge}/n0$ (nm) | (12) | (13) UPPER LIMIT (nm) |
| EMBODIMENT 3 | 45.0 | 2.29 | 0.48 | 0.49 | 0.97 | 0.50 | 0.50 | 20 | 0.38 | 210 |

What is claimed is:

1. An optical filter comprising:
a first multilayer film structure including a first optical layer and a second optical layer, the second optical layer having a refractive index lower than a refractive index of the first optical layer; and
a second multilayer film structure including a third optical layer and a fourth optical layer which are laminated alternately, the fourth optical layer having a refractive index lower than a refractive index of the third optical layer,
wherein the first multilayer film structure includes:
a first unit multilayer film with a width W1 including the first optical layer and the second optical layer which are laminated alternately, and
a second unit multilayer film with a width W2 including the first optical layer and the second optical layer which are laminated alternately,
wherein the first and second unit multilayer films are shifted from each other by a displacement D in a lamination direction of the first and second optical layers, and constitute a unit structure in which the first and second unit multilayer films are arranged adjacent to each other in an arrangement direction orthogonal to the lamination direction, and
wherein the following conditional expressions are satisfied:

15 [deg.]<$\varphi$<55[deg.], 1.5<$nH1 \cdot dH1/nL1 \cdot dL1$<5.0, and $0.25(dH1+dL1) \leq |D| \leq 0.75(dH1+dL1)$, where nH1 is the refractive index of the first optical layer, dH1 is an average layer thickness of the first optical layer, nL1 is the refractive index of the second optical layer, dL1 is an average layer thickness of the second optical layer, and $\varphi$ is a value which is defined as $\varphi=\tan^{-1}(|D|/0.5(W1+W2))$ [deg.] when |D| is not greater than $0.5(dL1+dH1)$ and is defined as $\varphi=\tan^{-1}(((dL1+dH1)-|D|)/0.5(W1+W2))$ [deg.] when |D| is greater than $0.5(dL1+dH1)$.

2. The optical filter according to claim 1, wherein the following conditional expressions are satisfied:

$0.35<((nH1 \cdot dH1(\varphi,<\theta 1>)+nL1 \cdot dL1(\varphi,<\theta 1>))/\lambda\text{ref}1<0.65$, and $0.35<((nH2 \cdot dH2(\theta H2)+nL2 \cdot dL2(\theta L2))/\lambda\text{ref}2<0.65$, where nH2 is the refractive index of the third optical layer, dH2 is an average layer thickness of the third optical layer, nL2 is the refractive index of the fourth optical layer, dL2 is an average layer thickness of the fourth optical layer, |θ|max and |θ|min are respectively a maximum value and a minimum value of an absolute value of a ray incident angle range which is required during the use of the optical filter on an incident plane which is parallel to the arrangement direction and the lamination direction, λref1 and λref2 are respectively center reflection wavelengths of the first and second multilayer film structures when polarized light which oscillates in parallel to the arrangement direction is incident at a center incident angle of θ0=(|θ|max+|θ|min)/2, the center reflection wavelengths λref1 and λref2 being center wavelengths of a wavelength at a short wavelength side and a wavelength at a long wavelength side having a reflectance of 50% in respective reflection bands, n0 is a refractive index of an incident medium, $dH1 \cdot \cos\varphi \cdot \cos(<\theta 1>-\varphi)$ and $dL1 \cdot \cos\varphi \cdot \cos(<\theta 1>-\varphi)$ are respectively an effective film thickness $dH1(\varphi,<\theta 1>)$ of the first optical layer and an effective film thickness $dL1(\varphi,<\theta 1>)$ of the second optical layer by oblique incidence, $\sin^{-1}(n0 \cdot \sin\theta 0/n_{\textit{eff}})$ and $\{2/(1/nH1^2+1/nL1^2)\}^{1/2}$ are respectively an average advancing angle <θ1> and an average refractive index $n_{\textit{eff}}$ in the first multilayer film structure, $dH2 \cdot \cos\theta H2$ and $dL2 \cdot \cos\theta L2$ are respectively an effective film thickness $dH2(\theta H2)$ of the third optical layer and an effective film thickness $dL2(\theta L2)$ of the fourth optical layer by the oblique incidence, and $\sin^{-1}(n0\cdot\sin\theta0/nH2)$ and $\sin^{-1}(n0\cdot\sin\theta0/nL2)$ are respectively an advancing angle $\theta H2$ in the third optical layer and an advancing angle $\theta L2$ in the fourth optical layer.

3. The optical filter according to claim 2, wherein:
the first multilayer film structure reflects a ray in a short wavelength band compared with the second multilayer film structure when a ray is incident at an angle represented by the minimum value $|\theta|\min$, and
the first multilayer film structure reflects a ray in a long wavelength band compared with the second multilayer film structure when the ray is incident at an angle represented by the maximum value $|\theta|\max$.

4. The optical filter according to claim 2, wherein the following conditional expression is satisfied:

$$0.75<(\lambda ref1/\lambda ref2)<1.25,$$

where $\lambda ref1$ and $\lambda ref2$ are the center reflection wavelengths in the first multilayer film structure and the second multilayer film structure, respectively, when the polarized light which oscillates in parallel to the arrangement direction is incident at the center incident angle $\theta0$.

5. The optical filter according to claim 2, wherein the following conditional expressions are satisfied:

$$|\Delta\lambda edge|/n0 \leq 20 \text{ nm, and}$$

$$(\cos|\theta|\min - \cos|\theta|\max)/n0 > 0.36,$$

where $\lambda edge$ is a wavelength with a larger shift amount caused by a change of an incident angle in wavelengths at a short wavelength side and at a long wavelength side having a reflectance of 50% in the reflection band within a visible range from 400 nm to 700 nm, and $\lambda edge$ is a shift amount of the wavelength $\lambda edge$ caused by the change of the incident angle when a ray is incident within the ray incident angle range from the minimum value $|\theta|\min$ to the maximum value $|\theta|\max$.

6. The optical filter according to claim 2, wherein the following conditional expression is satisfied:

$$0<W1+W2<\lambda ref2/(n0(\sin|\theta|\max+1)).$$

7. The optical filter according to claim 1, wherein the following conditional expression is satisfied:

$$1.5<nL2<2.0,$$

where $nL2$ is the refractive index of the fourth optical layer.

8. The optical filter according to claim 1, wherein the following conditional expressions are satisfied:

$$W1>W2, \text{ and}$$

$$W1/(W1+W2) \leq 0.8.$$

9. The optical filter according to claim 1, wherein at least one of the first and second multilayer film structures includes a ripple reduction layer.

10. The optical filter according to claim 9, wherein the ripple reduction layer includes a fifth optical layer.

11. The optical filter according to claim 1, wherein the unit structure of the first multilayer film structure is arranged in two dimensions in the arrangement direction orthogonal to the lamination direction.

12. The optical filter according to claim 1, further comprising a substrate, wherein:
the first multilayer film structure is formed on a first main surface of the substrate, and
the second multilayer film structure is formed on a second main surface opposite to the first main surface of the substrate.

13. The optical filter according to claim 1, further comprising a first substrate and a second substrate,
wherein the first multilayer film structure and the second multilayer film structure are provided between the first substrate and the second substrate.

14. An optical apparatus comprising:
an image display element, and
an optical filter comprising:
a first multilayer film structure including a first optical layer and a second optical layer, the second optical layer having a refractive index lower than a refractive index of the first optical layer; and
a second multilayer film structure including a third optical layer and a fourth optical layer which are laminated alternately, the fourth optical layer having a refractive index lower than a refractive index of the third optical layer,
wherein the first multilayer film structure includes:
a first unit multilayer film with a width $W1$ including the first optical layer and the second optical layer which are laminated alternately, and
a second unit multilayer film with a width $W2$ including the first optical layer and the second optical layer which are laminated alternately,
wherein the first and second unit multilayer films are shifted from each other by a displacement $D$ in a lamination direction of the first and second optical layers, and constitute a unit structure in which the first and second unit multilayer films are arranged adjacent to each other in an arrangement direction orthogonal to the lamination direction, and
wherein the following conditional expressions are satisfied:

$$15 \text{ [deg.]}<\varphi<55\text{[deg.]},$$

$$1.5<nH1\cdot dH1/nL1\cdot dL1<5.0, \text{ and}$$

$$0.25(dH1+dL1) \leq |D| \leq 0.75(dH1+dL1),$$

where $nH1$ is the refractive index of the first optical layer, $dH1$ is an average layer thickness of the first optical layer, $nL1$ is the refractive index of the second optical layer, $dL1$ is an average layer thickness of the second optical layer, and $\varphi$ is a value which is defined as $\varphi=\tan^{-1}(|D|/0.5(W1+W2))$ [deg.] when $|D|$ is not greater than $0.5(dL1+dH1)$ and is defined as $\varphi=\tan^{-1}(((dL1+dH1)-|D|)/0.5(W1+W2))$ [deg.] when $|D|$ is greater than $0.5(dL1+dH1)$.

15. An optical apparatus comprising:
an image pickup element, and
an optical filter comprising:
a first multilayer film structure including a first optical layer and a second optical layer, the second optical layer having a refractive index lower than a refractive index of the first optical layer; and
a second multilayer film structure including a third optical layer and a fourth optical layer which are laminated alternately, the fourth optical layer having a refractive index lower than a refractive index of the third optical layer,
wherein the first multilayer film structure includes:
a first unit multilayer film with a width $W1$ including the first optical layer and the second optical layer which are laminated alternately, and a second unit multilayer film with a width W2 including the first optical layer and the second optical layer which are laminated alternately, wherein the first and second unit multilayer films are shifted from each other by a displacement D in a lamination direction of the first and second optical layers, and constitute a unit structure in which the first and second unit multilayer films are arranged adjacent to each other in an arrangement direction orthogonal to the lamination direction, and wherein the following conditional expressions are satisfied:

$15 [\deg.] < \varphi < 55 [\deg.]$, $1.5 < nH1 \cdot dH1/nL1 \cdot dL1 < 5.0$, and $0.25(dH1+dL1) \leq |D| \leq 0.75(dH1+dL1)$, where nH1 is the refractive index of the first optical layer, dH1 is an average layer thickness of the first optical layer, nL1 is the refractive index of the second optical layer, dL1 is an average layer thickness of the second optical layer, and $\varphi$ is a value which is defined as $\varphi = \tan^{-1}(|D|/0.5(W1+W2))$ [deg.] when $|D|$ is not greater than $0.5(dL1+dH1)$ and is defined as $\varphi = \tan^{-1}(((dL1+dH1)-|D|)/0.5(W1+W2))$ [deg.] when $|D|$ is greater than $0.5(dL1+dH1)$.

* * * * *